(12) United States Patent
Kishi et al.

(10) Patent No.: US 10,221,811 B2
(45) Date of Patent: Mar. 5, 2019

(54) VAPORIZED FUEL PROCESSING APPARATUS

(71) Applicant: DENSO CORPORATION, Kariya, Aichi-pref. (JP)

(72) Inventors: Ryoyu Kishi, Kariya (JP); Tomohiro Itoh, Kariya (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 15/704,410

(22) Filed: Sep. 14, 2017

(65) Prior Publication Data

US 2018/0080415 A1    Mar. 22, 2018

(30) Foreign Application Priority Data

Sep. 16, 2016 (JP) .................. 2016-181462

(51) Int. Cl.
*F02M 25/08* (2006.01)
*G01M 3/28* (2006.01)

(52) U.S. Cl.
CPC ...... *F02M 25/0809* (2013.01); *F02M 25/089* (2013.01); *F02M 25/0818* (2013.01); *F02M 25/0836* (2013.01); *F02M 25/0872* (2013.01); *G01M 3/2815* (2013.01)

(58) Field of Classification Search
CPC ........... F02M 25/0818; F02M 25/0836; F02M 25/0872; F02M 25/089; F02M 25/0809; G01M 3/2815
USPC ........................................ 123/518, 516, 519
See application file for complete search history.

(56) References Cited

U.S. PATENT DOCUMENTS

| 5,685,285 | A  | * | 11/1997 | Ohtani | F02D 41/0045 123/520 |
| 5,758,628 | A  | * | 6/1998  | Wada   | F02D 41/0032 123/198 D |
| 6,182,642 | B1 | * | 2/2001  | Ohkuma | F02M 25/0818 123/519 |
| 2003/0019286 | A1 | * | 1/2003 | Wakahara | F02M 25/0809 73/114.41 |
| 2003/0029226 | A1 | * | 2/2003 | Kawano | F02M 25/0809 73/40.5 R |
| 2007/0051168 | A1 | * | 3/2007 | Kato   | F02M 25/0809 73/49.7 |

(Continued)

FOREIGN PATENT DOCUMENTS

EP          2108808  A1 * 10/2009  ......... F02M 25/0818

*Primary Examiner* — Mahmoud Gimie
(74) *Attorney, Agent, or Firm* — Nixon & Vanderhye PC

(57) ABSTRACT

A pressure sensor is provided in a purge pipe connecting a fuel tank to a canister, so that the pressure sensor outputs an electrical signal of a first sensor value depending on an inside pressure of the canister. A control unit calculates an estimated sealed pressure, which corresponds to the inside pressure of the canister in a condition that the canister and the fuel tank are in a sealed condition. The control unit determines that there is no leakage of fuel vapor, when the first sensor value is out of a first pressure range. The control unit determines that there is a small leakage of the fuel vapor, when the first sensor value is within the first pressure range but out of a second pressure range, wherein the second pressure range is smaller than the first pressure range. The control unit determines that there is a large leakage or a blocked-up condition in the purge pipe when the first sensor value is within the second pressure range.

16 Claims, 11 Drawing Sheets

(56) References Cited

U.S. PATENT DOCUMENTS

| | | | | |
|---|---|---|---|---|
| 2007/0246025 A1* | 10/2007 | Sato | .................... | F02D 41/0045 |
| | | | | 123/520 |
| 2012/0047999 A1* | 3/2012 | Itoh | .................... | F02M 25/0818 |
| | | | | 73/40 |
| 2014/0102421 A1* | 4/2014 | Kato | .................. | F02M 25/0818 |
| | | | | 123/520 |
| 2015/0096355 A1 | 4/2015 | Makino et al. | | |

\* cited by examiner

VAPORIZED FUEL PROCESSING APPARATUS

CROSS REFERENCE TO RELATED APPLICATION

This application is based on Japanese Patent Application No. 2016-181462 filed on Sep. 16, 2016, the disclosure of which is incorporated herein by reference.

FIELD OF TECHNOLOGY

The present disclosure relates to a vaporized fuel processing apparatus for an automotive vehicle, which detects leakage of fuel vapor from a fuel tank.

BACKGROUND

A vaporized fuel processing apparatus is known in the art, according to which fuel vapor is collected from a fuel tank and collected fuel is supplied into an intake system of an internal combustion engine. For example, as disclosed in Japanese Patent Publication No. 2015-75032, a vaporized fuel processing apparatus has a canister for collecting fuel vapor from a fuel tank and a pressure sensor is provided in the fuel tank for detecting pressure in the fuel tank, wherein a closed inside space of the fuel tank is pressurized by a jet pump which uses fuel flow pumped out by a fuel pump, in order to detect leakage of the fuel vapor of the fuel tank based on a pressure change in the fuel tank after the pressurization of the closed inside space.

However, in the above vaporized fuel processing apparatus, the pressurization by the jet pump is limited to the inside space of the fuel tank, when a connecting pipe for connecting the fuel tank to the canister is blocked up. It is not always possible to surely detect the leakage of the fuel vapor from the canister. In addition, it is not possible in the above vaporized fuel processing apparatus to detect whether the connecting pipe between the fuel tank and the canister is blocked up or not. It is, therefore, uncertain whether the detection for the leakage of the fuel vapor has been done not only for the fuel tank but also for the canister. In other words, detection accuracy for the leakage of the fuel vapor is not so high.

SUMMARY OF THE DISCLOSURE

The present disclosure is made in view of the above problem. It is an object of the present disclosure to provide a vaporized fuel processing apparatus, which is capable of not only detecting leakage of fuel vapor from a fuel tank but also detecting a blocked-up condition of a purge passage connecting the fuel tank to a canister.

According to one of features of the present disclosure, a vaporized fuel processing apparatus supplies vaporized fuel into an intake system of an internal combustion engine, wherein the vaporized fuel is generated in a fuel tank for storing fuel for the internal combustion engine. The vaporized fuel processing apparatus is composed of a canister, a first pressure sensor, a purge valve, an atmospheric valve, an electronic control unit and so on.

The first pressure sensor is provided at such a position as to detect an inside pressure of the canister and outputs an electrical signal depending on a detected pressure.

The purge valve is provided in a first purge pipe unit for operatively connecting an inside space of the canister to the intake system. In other words, the purge valve communicates the canister to the intake system or cuts off communication between the canister and the intake system.

The atmospheric valve is provided in an atmospheric pipe unit and selectively communicates the canister to the atmosphere or cuts off communication between the canister and the atmosphere.

The control unit is electrically connected to the first pressure sensor, the purge valve and the atmospheric valve, in order to control an opening or closing operation of each of the purge valve and the atmospheric valve.

The control unit compares a first sensor value detected by the first pressure sensor with two reference pressures, when not only the communication between the canister and the intake system but also the communication between the canister and the atmosphere is cut off. The control unit determines based on the above comparison result whether there is a leakage of fuel vapor from the fuel tank and whether there is a blocked-up condition in a second purge pipe unit connecting the fuel tank to the canister.

According to the vaporized fuel processing apparatus of the present disclosure, an inside space of the canister and an inside space of the fuel tank are communicated to each other via the second purge pipe unit, wherein the inside pressure of the canister is detected by the first pressure sensor. According to such a structure, the inside pressure of the canister is equal to that of the fuel tank in which the fuel vapor is generated, when the second purge pipe unit is not blocked up. However, the first sensor value of the first pressure sensor becomes different from the inside pressure of the fuel tank, when the second purge pipe unit is blocked up due to any reason.

The control unit of the vaporized fuel processing apparatus has the two reference pressures, with which the first sensor value is respectively compared. The control unit determines, based on respective comparison results between the first sensor value and the respective reference pressures, whether there is the blocked-up condition in the second purge pipe unit or not in addition to a detection process in which the control unit determines whether there is the leakage of the fuel vapor or not. The first sensor value corresponds to the inside pressure of the canister detected by the first pressure sensor when not only the communication between the canister and the intake system but also the communication between the canister and the atmosphere is cut off. According to the above feature, it is possible in the vaporized fuel processing apparatus of the present disclosure not only to detect the leakage of the fuel vapor but also to detect the blocked-up condition in the second purge pipe unit. Accordingly, detection accuracy for the fuel vapor can be improved.

BRIEF DESCRIPTION OF THE DRAWINGS

The above and other objects, features and advantages of the present disclosure will become more apparent from the following detailed description made with reference to the accompanying drawings. In the drawings.

DETAILED DESCRIPTION OF THE EMBODIMENTS

Figure 1:
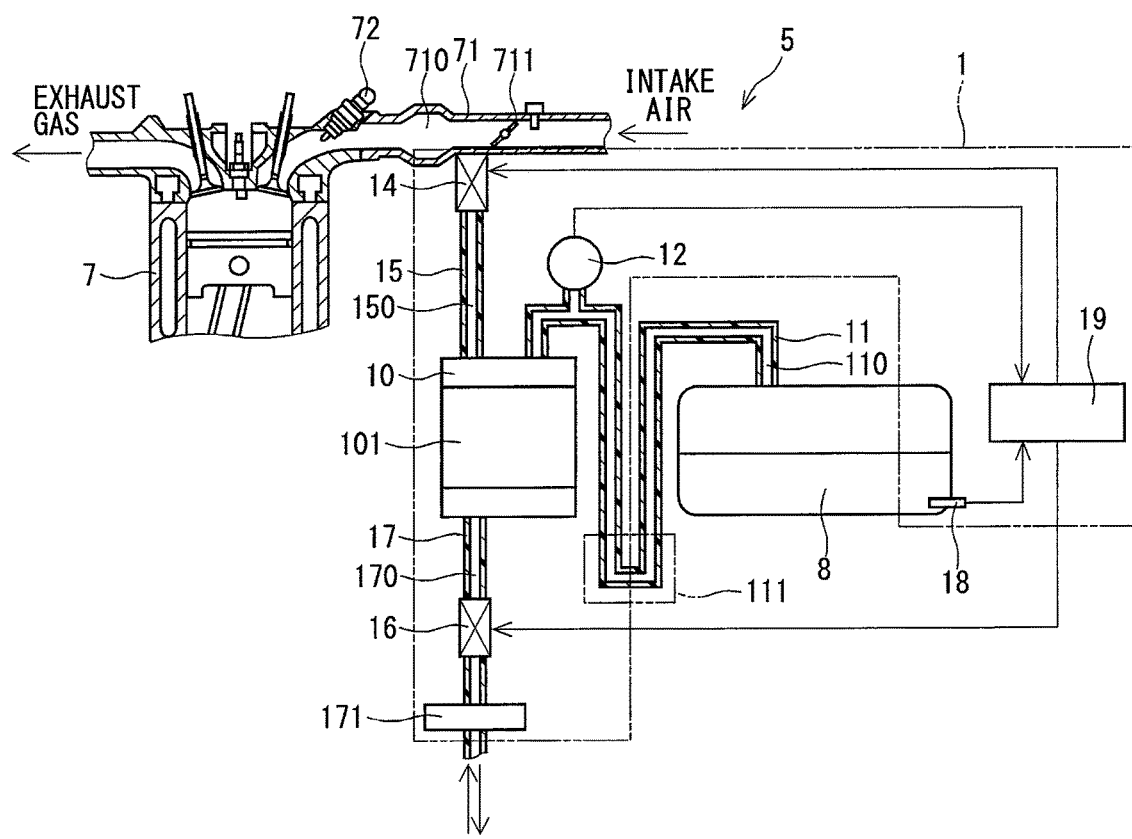
FIG. 1 is a schematic view showing a vaporized fuel processing apparatus according to a first embodiment of the present disclosure.

The present disclosure will be explained hereinafter by way of multiple embodiments and/or modifications with reference to the drawings. The same reference numerals are given to the same or similar parts or portions throughout the multiple embodiments and/or modifications in order to eliminate repeated explanation.

First Embodiment

Figure 2:
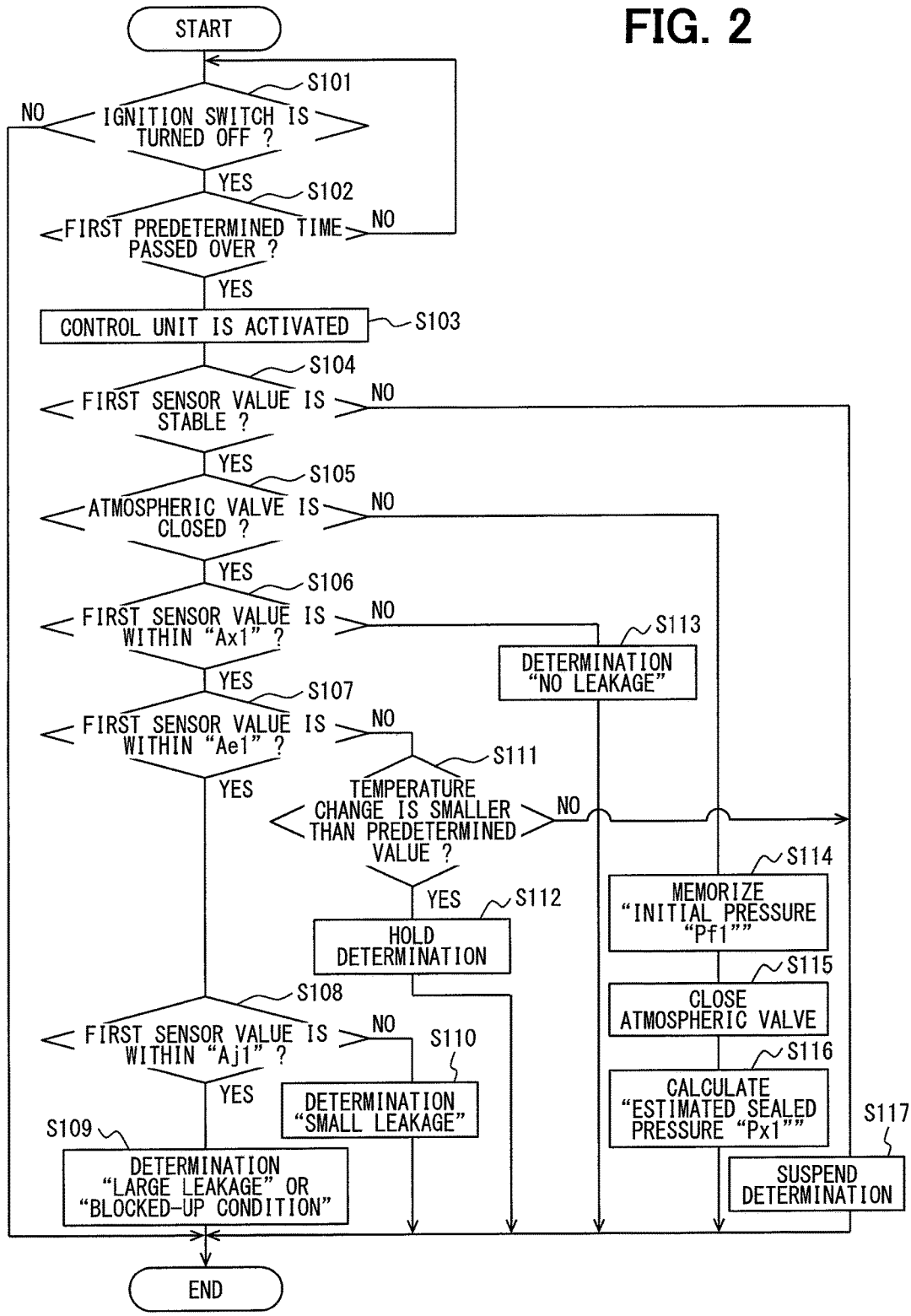
FIG. 2 is a flow chart showing a detection process for leakage of fuel vapor, which is carried out by the vaporized fuel processing apparatus according to the first embodiment.
Figure 3:
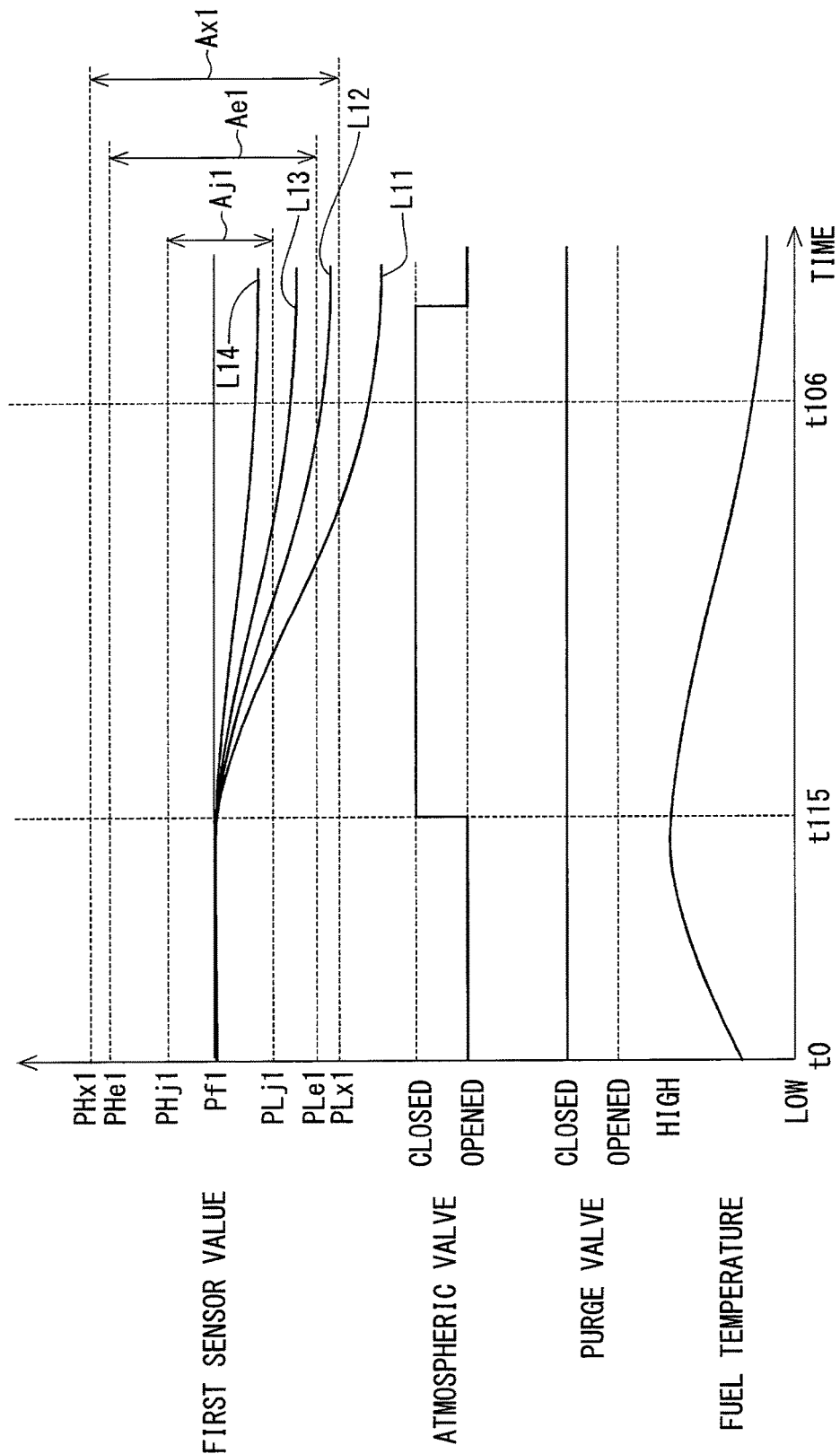
FIG. 3 is a time chart showing characteristics for the detection process of the first embodiment.

A vaporized fuel processing apparatus 1 according to a first embodiment of the present disclosure is shown in FIGS. 1 to 3. The vaporized fuel processing apparatus 1 of the present embodiment is applied to a fuel supply system 5 for an internal combustion engine 7 (hereinafter, the engine 7) for supplying fuel to the engine 7 mounted in an automotive vehicle (hereinafter, the vehicle).

As shown in FIG. 1, the fuel supply system 5 is composed of a fuel tank 8 and the vaporized fuel processing apparatus 1. In the fuel supply system 5, the fuel stored in the fuel tank 8 is pressurized by a fuel pump (not shown) and such pressurized fuel is injected from a fuel injection valve 72 (hereinafter, the injector 72), which is provided in an intake pipe 71 of the engine 7, into an intake-air passage 710. In addition, in the fuel supply system 5, vaporized fuel (hereinafter, the fuel vapor) generated in the fuel tank 8 is collected by a canister 10 of the vaporized fuel processing apparatus 1.

The fuel vapor collected by the canister 10 is purged into the intake-air passage 710 in accordance with a command signal from an electronic control unit 19 (hereinafter, the control unit 19) of the vaporized fuel processing apparatus 1. The intake pipe 71 for the intake-air passage 710 is one of components for an intake system of the engine 7.

The vaporized fuel processing apparatus 1 is composed of the canister 10, a first pressure sensor 12 (a first pressure detecting device 12), a purge valve 14, an atmospheric valve 16, a fuel temperature sensor 18, the control unit 19 and so on.

The canister 10 is connected to the fuel tank 8 via a second purge pipe unit 11 having a second purge passage 110. An inside space of the canister 10 is communicated to an inside space of the fuel tank 8 via the second purge passage 110. The canister 10 accommodates absorbing material 101 for absorbing the fuel vapor. The canister 10 supplies the fuel vapor absorbed by the absorbing material 101 into the intake-air passage 710 via a first purge passage 150 of a first purge pipe unit 15.

As shown in FIG. 1, the second purge pipe unit 11 is arranged so as to connect the canister 10 to the fuel tank 8 and has a vertical lower portion 111 (a lower portion in a direction of gravitational force). The fuel of liquid phase is likely to remain in the vertical lower portion 111. The vertical lower portion 111 is also referred to as a portion, which is easily blocked up or which is likely to be blocked up.

The first pressure sensor 12 is provided in the second purge pipe unit 11. In the present embodiment, the first pressure sensor 12 is provided at a first pipe section of the second purge pipe unit 11 between the canister 10 and the vertical lower portion 111. The first pressure sensor 12 can detect pressure in the inside space of the canister 10 via the second purge passage 110 formed by the second purge pipe unit 11. The first pressure sensor 12 outputs an electrical signal depending on detected pressure to the control unit 19, which is electrically connected to the first pressure sensor 12.

The purge valve 14 is provided in the first purge pipe unit 15 forming the first purge passage 150. The purge valve 14 controls a communication condition between the canister 10 and the intake-air passage 710 via the first purge passage 150. More exactly, the purge valve 14 operatively switches the communication condition from a communicated state to a non-communicated state, or vice versa. In addition, the purge valve 14 controls an opening degree of the first purge passage 150. The purge valve 14 is composed of an electromagnetic valve electrically connected to the control unit 19. An amount of the fuel vapor to be purged into a downstream side of a throttle valve 711, which is provided in the intake-air passage 710, can be controlled when the opening degree of the first purge passage 150 is controlled by the purge valve 14.

The atmospheric valve 16 is provided in an atmospheric pipe unit 17 having an atmospheric passage 170, so that the inside space of the canister 10 is operatively communicated to the atmosphere. The atmospheric valve 16 controls a communication condition between the canister 10 and the atmosphere via the atmospheric passage 170. Namely, the atmospheric valve 16 operatively switches the communication condition between the canister 10 and the atmosphere from a communicated state to a non-communicated state, or vice versa. The atmospheric valve 16 is composed of an electromagnetic valve electrically connected to the control unit 19.

An atmospheric filter 171 is provided in the atmospheric pipe unit 17 for removing extraneous materials contained in the air.

The fuel temperature sensor 18 is provided in the fuel tank 8. The fuel temperature sensor 18 detects temperature of the fuel in the fuel tank 8 and outputs an electrical signal depending on detected fuel temperature to the control unit 19, which is electrically connected to the fuel temperature sensor 18.

The control unit 19 is composed of a micro-computer having CPU as a calculation portion, RAM and ROM as memory portions and so on. The control unit 19 is electrically connected to the first pressure sensor 12, the purge valve 14, the atmospheric valve 16, and the fuel temperature sensor 18. The control unit 19 controls operations of the purge valve 14 and the atmospheric valve 16 based on the electrical signals outputted from the first pressure sensor 12 and the fuel temperature sensor 18.

A process for detecting the leakage of the fuel vapor, which is carried out by the vaporized fuel processing apparatus 1, will be explained with reference to FIGS. 2 and 3. FIG. 2 is a flow chart showing a detection process for the leakage of the fuel vapor. FIG. 3 is a time chart showing characteristics for the detection process. In the present embodiment, the detection process of FIG. 2 is arbitrarily carried out.

At first, a vehicle control unit (not shown) determines at a step S101 whether an ignition switch for the vehicle is turned off or not. The vehicle control unit is an electronic control unit, which is functionally superior to the control unit 19. When the vehicle control unit determines that the ignition switch is turned off (YES at the step S101), the detection process goes to a step S102. When the vehicle control unit determines that the ignition switch is not turned off (NO at the step S101), that is, the ignition switch is in a turned-on condition, the detection process of this cycle for the leakage of the fuel vapor is terminated.

When the vehicle control unit determines at the step S101 that the ignition switch is turned off (YES at the step S101), the vehicle control unit determines at the step S102 whether a first predetermined time has passed over since the ignition switch for the vehicle is turned off. The first predetermined time is a rather short time since the ignition switch for the vehicle is turned off. When the first predetermined time has passed over (YES at the step S102), the detection process goes to a step S103. When the first predetermined time has not yet passed over (NO at the step S102), the detection process goes back to the step S101.

When the first predetermined time has passed over since the ignition switch is turned off (YES at the step S102), the control unit 19 is activated at the step S103.

At a step S104, the control unit 19 determines whether a pressure value (hereinafter, a first sensor value) detected by the first pressure sensor 12 is stable or not. The control unit 19 determines that the first sensor value is stable, when a change of the first sensor value is within a predetermined small range during a predetermined time period.

When the control unit 19 determines that the first sensor value is stable, namely, when the change of the first sensor value is within the predetermined small range (YES at the step S104), the detection process goes to a step S105.

On the other hand, when the control unit 19 determines that the first sensor value is not stable, namely, when the change of the first sensor value is relatively large (NO at the step S104), the detection process goes to a step S117. The control unit 19 suspends at the step S117 the determination for the leakage of the fuel vapor and the detection process of this cycle is terminated. This is because accuracy for an estimated sealed pressure to be calculated at a step S116 (explained below) may be decreased when the first sensor value is not stable. More exactly, the step S117 is done in order to avoid an erroneous determination for the leakage of the fuel vapor of the fuel tank 8 as well as an erroneous determination for a blocked-up condition of the second purge pipe unit 11. In this case (the step S117), the control unit 19 carries out again the detection process for the leakage of the fuel vapor, after a predetermined time passes over.

When the control unit 19 determines at the step S104 that the first sensor value is stable (YES at the step S104), the control unit 19 determines at the step S105 whether the atmospheric valve 16 is closed or not. When the control unit 19 determines that the atmospheric valve 16 is closed (YES at the step S105), the detection process goes to a step S106. When the control unit 19 determines that the atmospheric valve 16 is not closed (NO at the step S105), the detection process goes to a step S114.

At a timing immediately after the ignition switch of the vehicle is turned off, the atmospheric valve 16 is generally opened. Therefore, in the detection process which is carried out immediately after the ignition switch is turned off, the detection process goes to the step S114 as a result of the determination at the step S105 (NO at the step S105). The purge valve 14 is closed after the ignition switch is turned off, because it is not necessary to supply the fuel vapor into the intake-air passage 710 (after a timing "t0" in FIG. 3).

When the control unit 19 determines at the step S105 that the atmospheric valve 16 is not closed, the control unit 19 memorizes an initial pressure "Pf1" at the step S114. As explained above, since the atmospheric valve 16 is opened at the timing immediately after the ignition switch is turned off, the inside space of the canister 10 is communicated to the atmosphere. In other words, the initial pressure "Pf1" is generally equal to the atmospheric pressure.

The detection process further goes from the step S114 to a step S115, in which the control unit 19 closes the atmospheric valve 16 at a timing "t115" shown in FIG. 3. As a result, the inside space of the canister 10 as well as the inside space of the fuel tank 8 becomes a sealed condition.

At the step S116, the control unit 19 calculates the estimated sealed pressure, which is hereinafter indicated by "Px1". The estimated sealed pressure "Px1" corresponds to such a pressure, which is estimated for the pressure of the canister 10 in the sealed condition. The control unit 19 calculates the estimated sealed pressure "Px1" based on a map prepared in advance and memorized in the memory portion as well as the temperature of the fuel in the fuel tank 8 detected by the fuel temperature sensor 18. The estimated sealed pressure "Px1" is used as a first reference pressure when the determination for the leakage of the fuel vapor as well as the determination for the blocked-up condition is carried out. The control unit 19 calculates the estimated sealed pressure "Px1" in the following two manners depending on a difference of a change of the fuel temperature in the fuel tank 8. Namely, the control unit 19 calculates a low-pressure side estimated sealed pressure "PLx1" which is lower than the initial pressure "Pf1" and a high-pressure side estimated sealed pressure "PHx1" which is higher than the initial pressure "Pf1". The low-pressure side estimated sealed pressure "PLx1" corresponds to the estimated sealed pressure "Px1", which is obtained by estimating that the fuel temperature in the fuel tank 8 is gradually decreased after the atmospheric valve 16 is closed. On the other hand, the high-pressure side estimated sealed pressure "PHx1" corresponds to the estimated sealed pressure "Px1", which is obtained by estimating that the fuel temperature in the fuel tank 8 is gradually increased after the atmospheric valve 16 is closed.

When the control unit 19 calculates the estimated sealed pressure "Px1" (including "PLx1" and "PHx1") at the step S116, the detection process of this cycle is once terminated.

Thereafter, the control unit 19 carries out again the detection process of FIG. 2 for the leakage of the fuel vapor.

After the steps S101 to S104, the control unit 19 determines at the step S105 whether the atmospheric valve 16 is closed or not. Since the atmospheric valve 16 is closed by the step S115 of the previous cycle, the detection process goes to the step S106.

When the fuel temperature is changed, for example, when the fuel temperature is gradually decreased, as shown in FIG. 3, it is estimated that the pressure value in the canister 10 as well as fuel tank 8 is correspondingly changed. In this view point, after a predetermined time from the timing "t115" to a timing "t106" shown in FIG. 3 has passed over, the control unit 19 determines at the step S106 whether the first sensor value (which corresponds to the first sensor value obtained when the inside space of the canister 10 as well as the inside space of the fuel tank 8 is in the sealed condition) is within a first pressure range "Ax1" (a range between "PHx1" and "PLx1") for the estimated sealed pressure "Px1" or not.

When the control unit 19 determines that the first sensor value is within the first pressure range "Ax1" for the estimated sealed pressure (YES at the step S106), the detection process goes to a step S107.

On the other hand, when the control unit 19 determines that the first sensor value is outside of the first pressure range "Ax1" for the estimated sealed pressure (NO at the step S106), the detection process goes to a step S113. The control unit 19 determines at the step S113 that the fuel tank 8 does not have a leakage hole larger than a predetermined leakage value and a leakage amount of the fuel vapor is smaller than a predetermined leakage amount. In other words, the control unit 19 determines at the step S113 that there is "no leakage" of the fuel vapor.

The detection process for the fuel vapor of this cycle is terminated after the determination at the step S113.

When the control unit 19 determines at the step S106 that the first sensor value is within the first pressure range "Ax1" for the estimated sealed pressure, the control unit 19 determines at the step S107 whether the first sensor value is within a third pressure range "Ae1" (a range between "PHe1" and "PLe1") for an error determination pressure.

As shown in FIG. 3, the third pressure range "Ae1" for the error determination pressure includes a high-pressure side error determination pressure "PHe1", which is defined as a third reference pressure set at a value between the high-pressure side estimated sealed pressure "PHx1" and the initial pressure "Pf1", and a low-pressure side error determination pressure "PLe1", which is also defined as the third reference pressure set at a value between the low-pressure side estimated sealed pressure "PLx1" and the initial pressure "Pf1". Each of the error determination pressures "PHe1" and "PLe1" is set at such a value relatively closer to the respective high-pressure side and the low-pressure side estimated sealed pressures "PHx1" and "PLx1". Therefore, the determination at the step S107 for the third pressure range "Ae1" of the error determination pressure means that the control unit 19 determines whether the first sensor value is within the third pressure range "Ae1" between the high-pressure side error determination pressure "PHe1" and the low-pressure side error determination pressure "PLe1".

When the control unit 19 determines that the first sensor value is within the third pressure range "Ae1" for the error determination pressure (YES at the step S107), the detection process goes to a step S108.

When the control unit 19 determines that the first sensor value is outside of the third pressure range "Ae1" for the error determination pressure (NO at the step S107), the detection process goes to a step S111.

When the control unit 19 determines at the step S107 that the first sensor value is within the third pressure range "Ae1" for the error determination pressure, the control unit 19 determines at the step S108 whether the first sensor value is within a second pressure range "Aj1" (a range between "PHj1" and "PLj1") for a leakage determination pressure. The second pressure range "Aj1" for the leakage determination pressure is defined as a second reference pressure. As shown in FIG. 3, the leakage determination pressure includes a high-pressure side leakage determination pressure "PHj1", which is set at a value between the high-pressure side error determination pressure "PHe1" and the initial pressure "Pf1", and a low-pressure side leakage determination pressure "PLj1", which is set at a value between the low-pressure side error determination pressure "PLe1" and the initial pressure "Pf1". Therefore, the determination at the step S108 for the second pressure range "Aj1" of the leakage determination pressure means that the control unit 19 determines whether the first sensor value is within the second pressure range "Aj1" between the high-pressure side leakage determination pressure "PHj1" and the low-pressure side leakage determination pressure "PLj1".

When the control unit 19 determines that the first sensor value is within the second pressure range "Aj1" for the leakage determination pressure (YES at the step S108), the detection process goes to a step S109. At the step S109, the control unit 19 determines that the fuel tank 8 has a first leakage hole much larger than the predetermined leakage value or determines that the second purge pipe unit 11 is blocked up. In other words, the control unit 19 determines that there is "a large leakage condition" or "the blocked-up condition".

When the control unit 19 determines that the first sensor value is outside of the second pressure range "Aj1" for the leakage determination pressure (NO at the step S108), the detection process goes to a step S110. At the step S110, the control unit 19 determines that the fuel tank 8 has a second leakage hole slightly larger than the predetermined leakage value (smaller than the first leakage hole). In other words, the control unit 19 determines that there is "a small leakage condition".

The detection process for the fuel vapor of this cycle is terminated after the determination at the step S109 or the step S110.

When the control unit 19 determines at the step S107 that the first sensor value is outside of the third pressure range "Ae1" for the error determination pressure, the process goes to the step S111, at which the control unit 19 determines whether a temperature change of the fuel tank 8 is smaller than a predetermined temperature value or not.

When the control unit 19 determines that the temperature change of the fuel tank 8 is smaller than the predetermined temperature value (YES at the step S111), the detection process goes to a step S112. The control unit 19 holds up the determination in the detection process for the fuel vapor of this cycle. When the temperature change of the fuel tank 8 is smaller than the predetermined temperature value, a change of the first sensor value per unit time becomes relatively smaller and thereby determination accuracy is correspondingly decreased. A postponement of the determination at the step S112 is done in order to avoid the erroneous determination relating to the leakage of the fuel vapor of the fuel tank 8 as well as the erroneous determination relating to the blocked-up condition of the second purge pipe unit 11. The detection process for the fuel vapor of this cycle is terminated after the step S112.

When the control unit 19 determines that the temperature change of the fuel tank 8 is larger than the predetermined temperature value (NO at the step S111), the detection process goes to the step S117 in order that the control unit 19 suspends the determination for the leakage of the fuel vapor in the detection process of this cycle. The detection process for the fuel vapor of this cycle is terminated after the step S117. This is because it can be thought that the determination for the leakage of the fuel vapor of the fuel tank 8 and/or the determination for the blocked-up condition of the second purge pipe unit 11 may not be correctly done as a result that the first sensor value is erroneously detected due to disturbance, such as impact or the like.

The detection process for the fuel vapor of this cycle is carried out again after the determination at the step S117, when the predetermined time has passed over.

In the vaporized fuel processing apparatus 1, the first pressure sensor 12 is provided at such a position as to detect the pressure in the canister 10. Since the fuel vapor cannot flow from the fuel tank 8 into the canister 10 when the second purge pipe unit 11 is blocked up, the first sensor value becomes such a value largely different from the estimated sealed pressure "Px1". According to the vaporized fuel processing apparatus 1, the pressure change of the canister 10 communicated to the fuel tank 8 is detected by the first pressure sensor 12, when the fuel temperature in the fuel tank 8 is not largely but properly changed. The control unit 19 of the vaporized fuel processing apparatus 1 determines the leakage of the fuel vapor of the fuel tank 8 as well as the blocked-up condition of the second purge pipe unit 11 based on the detection results of the first pressure sensor 12. More detailed explanation for such determination will be made with reference to FIG. 3.

As shown in FIG. 3, the fuel temperature of the fuel tank 8 is gradually decreased as time passes over. More exactly, the first sensor value is gradually decreased after the timing "t115" in accordance with the decrease of the fuel temperature in the fuel tank 8, as indicated by respective solid lines L11, L12, L13 and L14 in FIG. 3.

In a case that the first sensor value is decreased along the solid line L11 of FIG. 3, the first sensor value becomes smaller (lower) than the low-pressure side estimated sealed pressure "PLx1" when the step S106 is carried out at the timing "t106" (the determination at the step S106 is NO). In this case, the leakage amount of the fuel vapor from the fuel tank 8 is extremely small. Therefore, it is considered that the fuel tank 8 does not have any leakage hole larger than the predetermined leakage value. As a result, the control unit 19 determines at the step S113 that there is substantially "no leakage" of the fuel vapor in the fuel tank 8.

In a case that the first sensor value is decreased along the solid line L13 of FIG. 3, the first sensor value becomes larger (higher) than the low-pressure side estimated sealed pressure "PLx1" but smaller (lower) than the low-pressure side leakage determination pressure "PLj1", at the timing "t106". Namely, the determination at each of the steps S106 and S107 is YES, while the determination at the step S108 is NO. In this case, it is considered that the fuel tank 8 has a leakage hole (that is, the second leakage hole) slightly larger than the predetermined leakage value, because the leakage amount of the fuel vapor from the fuel tank 8 is slightly larger than the predetermined leakage amount. As a result, the control unit 19 determines at the step S110 that there is "small leakage" of the fuel vapor in the fuel tank 8.

In a case that the first sensor value is decreased along the solid line L14 of FIG. 3, the first sensor value becomes larger (higher) than the low-pressure side leakage determination pressure "PLj1" at the timing "t106". Namely, the determination at each of the steps S106, S107 and S108 is YES. In this case, it is considered as one of reasons that the fuel tank 8 has the leakage hole (that is, the first leakage hole) much large than the predetermined leakage value, because the leakage amount of the fuel vapor from the fuel tank 8 is extremely larger than the predetermined leakage amount. In addition, it is considered as another reason that the first sensor value (corresponding to the pressure in the canister 10) is not largely changed from the initial pressure "Pf1", because the second purge pipe unit 11 is blocked up and thereby the fuel vapor (generation amount of which varies depending on the temperature change) cannot flow from the fuel tank 8 into the canister 10. As a result, the control unit 19 determines at the step S109 that there is "large leakage" of the fuel vapor in the fuel tank 8 or "the blocked-up condition" in the second purge pipe unit 11.

As above, according to the vaporized fuel processing apparatus 1 of the present embodiment, it is possible to determine not only the leakage of the fuel vapor of the fuel tank 8 but also the blocked-up condition of the second purge pipe unit 11, based on the comparison results between the first sensor value at the timing "t106" and the estimated sealed pressure "Px1" (the first reference pressure including "PHx1" and "PLx1") and the leakage determination pressure (the second reference pressure including "PHj1" and "PLj1").

In addition, according to the vaporized fuel processing apparatus 1 of the present embodiment, the control unit 19 determines at the step S107 whether the first sensor value is within the third pressure range "Ae1" for the error determination pressure or not.

In a case that the first sensor value is decreased along the solid line L12 of FIG. 3, the first sensor value becomes larger (higher) than the low-pressure side estimated sealed pressure "PLx1" but smaller (lower) than the low-pressure side error determination pressure "PLe1" at the timing "t106". In other words, the first sensor value is within the first pressure range "Ax1" for the estimated sealed pressure (YES at the step S106) but outside of the third pressure range "Ae1" for the error determination pressure (NO at the step S107). When the first sensor value is within the first pressure range "Ax1" for the estimated sealed pressure but closer to the low-pressure side estimated sealed pressure "PLx1", the determination for the leakage of the fuel vapor is held (at the step S112) or postponed (at the step S117) depending on the temperature change of the fuel in the fuel tank 8 by taking into consideration the calculation accuracy for the estimated sealed pressure "Px1" at the step S116. This (the step S112 or S117) is done in order to avoid the erroneous determination for the leakage of the fuel vapor. As a result, it is possible to improve the determination accuracy for the determination for the leakage of the fuel vapor as well as the determination for the blocked-up condition of the second purge pipe unit 11.

Second Embodiment

A vaporized fuel processing apparatus 2 according to a second embodiment of the present disclosure will be explained with reference to FIGS. 4 to 6. The second embodiment differs from the first embodiment in that a pump (a first pump 19) is provided in the vaporized fuel processing apparatus 2 of the second embodiment.

Figure 4:
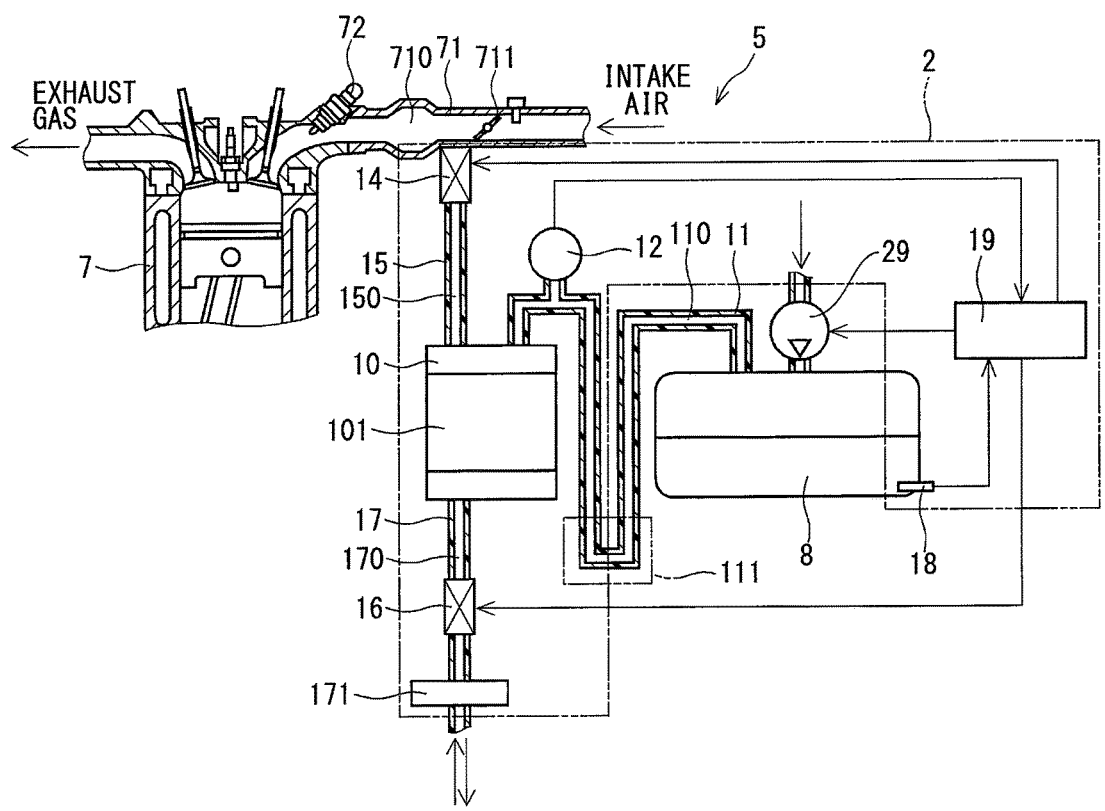
FIG. 4 is a schematic view showing a vaporized fuel processing apparatus according to a second embodiment of the present disclosure.
Figure 5:
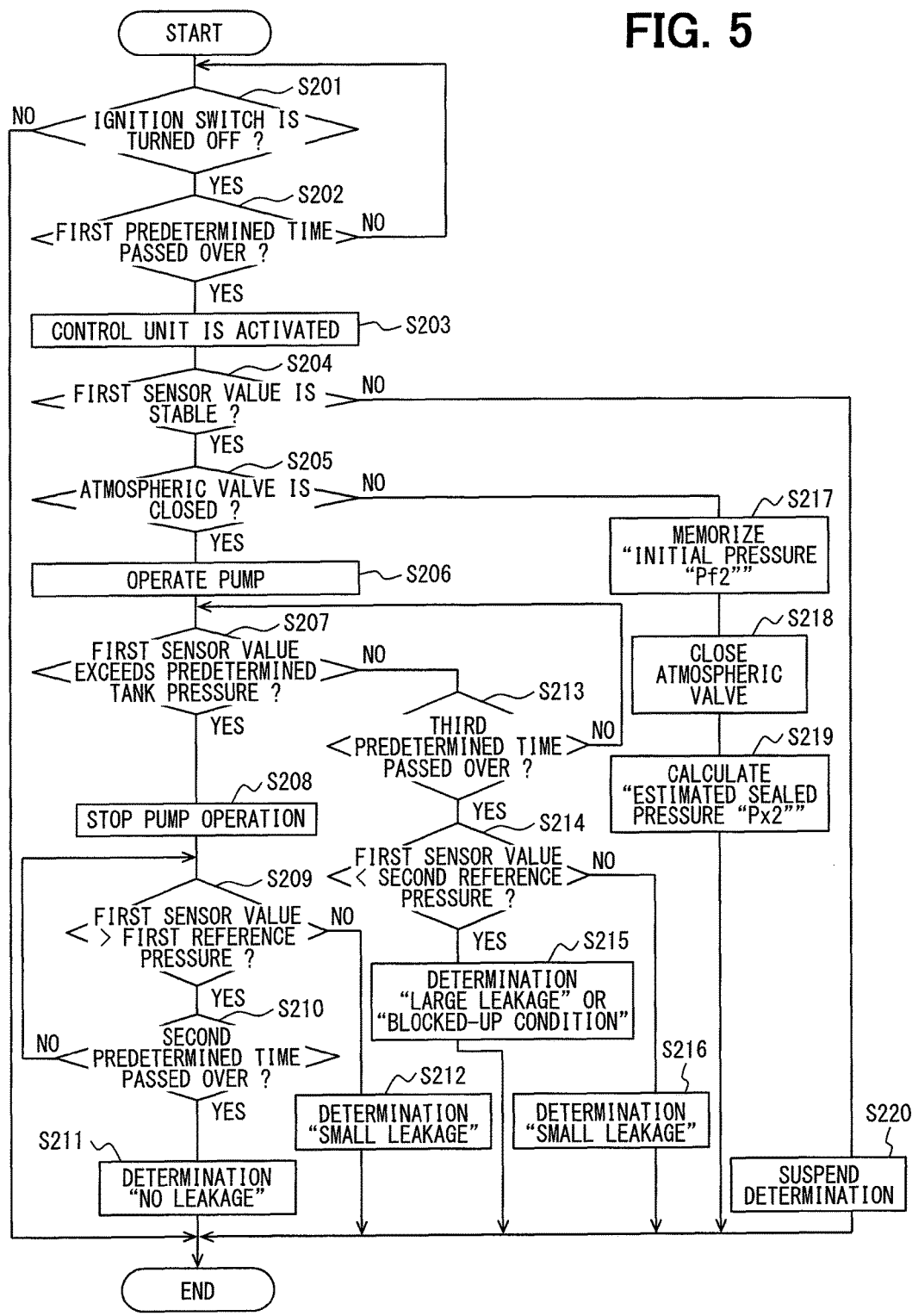
FIG. 5 is a flow chart showing a detection process for leakage of fuel vapor, which is carried out by the vaporized fuel processing apparatus according to the second embodiment.

FIG. 4 schematically shows a structure of the vaporized fuel processing apparatus 2 of the second embodiment, which is composed of the canister 10, the first pressure sensor 12, the purge valve 14, the atmospheric valve 16, the fuel temperature sensor 18, the first pump 29 (a first pressure changing unit), the control unit 19 and so on.

The first pump 29 is attached to the fuel tank 8 in order to pressurize the inside space of the fuel tank 8 in accordance with a command from the control unit 19, to which the first pump 29 is electrically connected.

A process for detecting the leakage of the fuel vapor in the vaporized fuel processing apparatus 2 will be explained with reference to FIGS. 5 and 6. FIG. 5 is a flowchart showing a detection process for the leakage of the fuel vapor. FIG. 6 is a time chart showing characteristics for the detection process. In the present embodiment, the detection process of FIG. 5 is arbitrarily carried out.

At a step S201, the vehicle control unit (not shown) determines whether the ignition switch for the vehicle is turned off or not, like the step S101 of the first embodiment.

At a step S202, the vehicle control unit determines whether the first predetermined time has passed over since the ignition switch for the vehicle is turned off, like the step S102 of the first embodiment.

At a step S203, the control unit 19 is activated, like the step S103 of the first embodiment.

At a step S204, the control unit 19 determines whether the first sensor value is stable or not, like the step S104 of the first embodiment. When the control unit 19 determines at the step S204 that the first sensor value is not stable (NO at the step 204), the process goes to a step S220. At the step S220, the control unit 19 suspends the determination for the leakage of the fuel vapor. The detection process for the leakage of the fuel vapor is repeated again after the predetermined time has passed over.

At a step S205, the control unit 19 determines whether the atmospheric valve 16 is closed or not, like the step S105 of the first embodiment. In a first detection cycle for the leakage of the fuel vapor immediately after the ignition switch of the vehicle is turned off, the detection process goes to a step S217.

At the step S217, the control unit 19 memorizes an initial pressure "Pf2", like the step S114 of the first embodiment.

Figure 6:
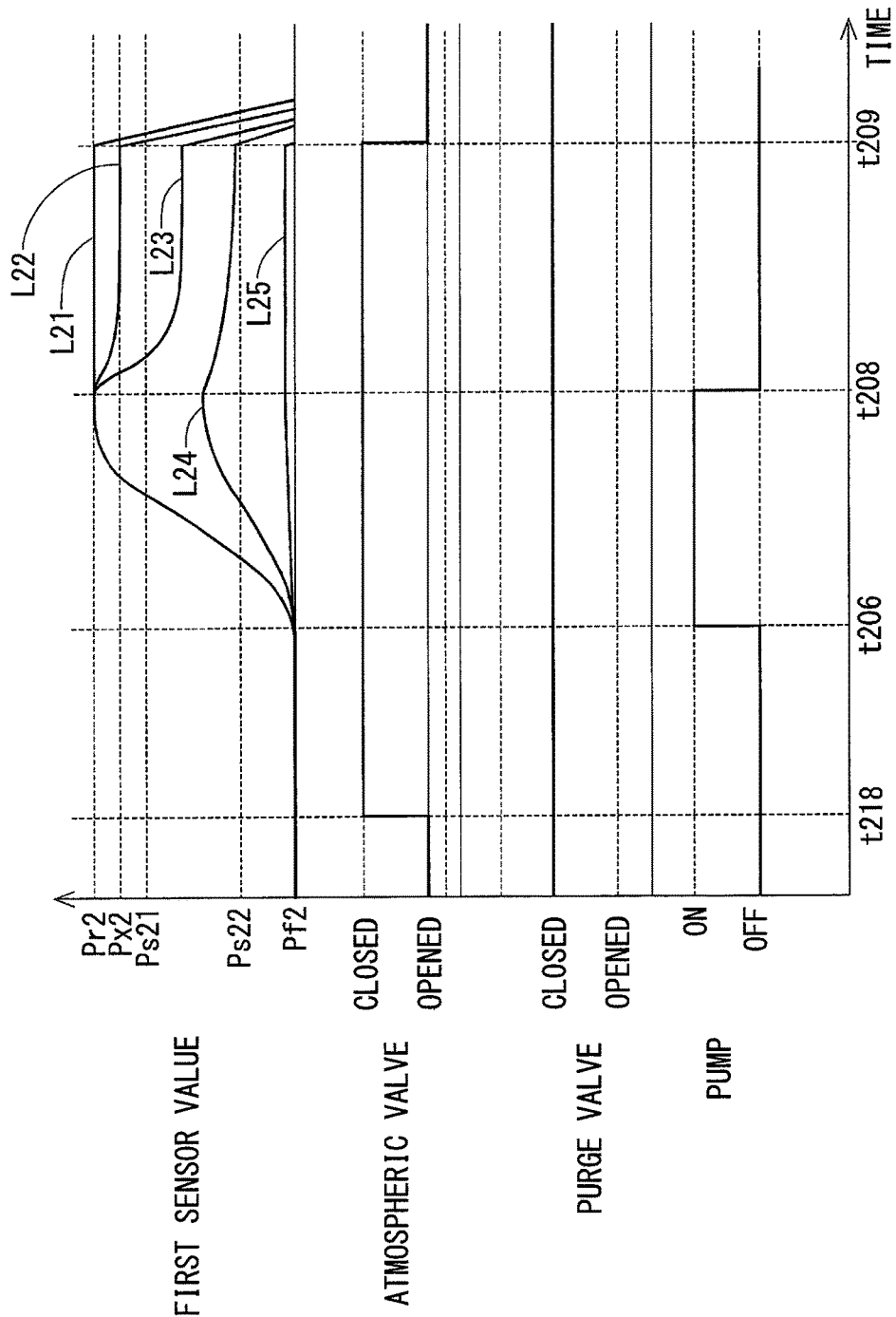
FIG. 6 is a time chart showing characteristics for the detection process of the second embodiment.

At a step S218, the control unit 19 closes the atmospheric valve 16 at a timing "t218" shown in FIG. 6, like the step S115 of the first embodiment. As a result, the inside space of the canister 10 as well as the inside space of the fuel tank 8 becomes the sealed condition.

At a step S219, the control unit 19 calculates an estimated sealed pressure "Px2", like the step S116 of the first embodiment. At the step S219, the control unit 19 calculates the pressure in the inside space of the canister 10 and the fuel tank 8 as the estimated sealed pressure "Px2". The estimated sealed pressure "Px2" corresponds to such a pressure, which is estimated for the inside pressure of the canister 10 and the fuel tank 8 in a condition that the canister 10 and the fuel tank 8 are in the sealed condition and the first pump 29 is operated. When the estimated sealed pressure "Px2" is calculated, the detection process of this cycle is once terminated.

The detection process for the leakage of the fuel vapor is carried out again, after the detection process of the previous cycle is once terminated.

After the steps S201 to S204, the control unit 19 determines at the step S205 whether the atmospheric valve 16 is closed or not. Since the atmospheric valve 16 is closed by the step S218 of the previous cycle, the detection process goes to a step S206.

At the step S206, the first pump 29 is operated. When the control unit 19 starts an operation of the first pump 29 at a timing "t206" of FIG. 6, the inside space of the fuel tank 8 is pressurized.

At a step S207, the control unit 19 determines whether the first sensor value exceeds a predetermined tank pressure "Pr2" or not. When the inside space of the fuel tank 8 is pressurized at the step S206, an inside pressure of the fuel tank 8 is increased as indicated by respective solid lines L21 to L25 in FIG. 6. The predetermined tank pressure "Pr2" is set at a value larger (higher) than the estimated sealed pressure "Px2", which is calculated at the step S219.

When the control unit 19 determines that the first sensor value exceeds the predetermined tank pressure "Pr2" (YES at the step S207), the detection process goes to a step S208. When the control unit 19 determines that the first sensor value does not yet exceed the predetermined tank pressure "Pr2" (NO at the step S207), the detection process goes to a step S213.

When the control unit 19 determines at the step S207 that the first sensor value exceeds the predetermined tank pressure "Pr2", the operation of the first pump 29 is terminated at the step S208, at a timing "t208" in FIG. 6.

At a step S209, the control unit 19 determines whether the first sensor value is larger (higher) than a first reference pressure "Ps21" at a timing "t209" in FIG. 6. The first reference pressure "Ps21" is set at a value between the estimated sealed pressure "Px2" and the initial pressure "Pf2". More exactly, the first reference pressure "Ps21" corresponds to such a pressure of the canister 10, which is obtained when a predetermined time (a second predetermined time from the timing "t208" to the timing "t209" in FIG. 6) has passed over after the first pump 29 is stopped at the step S208. The second predetermined time corresponds to a time period during which the pressure of the canister 10 is stabilized after the inside space of the fuel tank 8 having a leakage hole equal to the predetermined leakage value is pressurized up to the predetermined tank pressure "Pr2".

When the control unit 19 determines that the first sensor value is larger (higher) than the first reference pressure "Ps21" (YES at the step S209), the detection process goes to a step S210. When the control unit 19 determines that the first sensor value is smaller (lower) than the first reference pressure "Ps21" (NO at the step S209), the detection process goes to a step S212. At the step S212, the control unit 19 determines that the fuel tank 8 has a leakage hole (the second leakage hole), which is slightly larger than the predetermined leakage value. In other words, the control unit 19 determines at the step S212 that there is "small leakage" of the fuel vapor. The detection process for the leakage of the fuel vapor of this cycle is once terminated after the determination at the step S212.

When the control unit 19 determines at the step S209 that the first sensor value is larger (higher) than the first reference pressure "Ps21" (YES at the step S209), the control unit 19 determines at the step S210 whether the predetermined second time has passed over or not. More exactly, at the step S210, the control unit 19 determines whether the predetermined second time has passed over from the timing "t208", at which the operation of the first pump 29 is stopped by the step S208.

When the control unit 19 determines that the predetermined second time has passed over from the timing "t208" (YES at the step S210), the detection process goes to a step S211. At the step S211, the control unit 19 determines that the fuel tank 8 does not have a leakage hole larger than the predetermined leakage value. In other words, the control unit 19 determines that there is "no leakage" of the fuel vapor. The detection process for the leakage of the fuel vapor of this cycle is once terminated after the step S211.

When the control unit 19 determines at the step S210 that the predetermined second time has not yet passed over from the timing "t208" (NO at the step S210), the process goes back to the step S209.

When the control unit 19 determines at the step S207 that the first sensor value does not exceed the predetermined tank pressure "Pr2" (NO at the step S207), the control unit 19 determines at the step S213 whether a predetermined third time (e.g., a time from the timing "t206" to the timing "t208" in FIG. 6) has passed over or not since the first pump 29 was operated at the step S206. At the step S213, the control unit 19 determines whether the predetermined third time passed over or not after the operation by the step S206. When the control unit 19 determines that the predetermined third time has passed over from the timing "t206" (YES at the step S213), the detection process goes to a step S214. When the control unit 19 determines that the predetermined third time has not yet passed over from the timing "t206" (NO at the step S213), the detection process goes back to the step S207.

When the control unit 19 determines at the step S213 that the predetermined third time has passed over from the timing "t206", the control unit 19 determines at the step S214 whether the first sensor value is smaller (lower) than a second reference pressure "Ps22". The second reference pressure "Ps22" is set at such a value between the first reference pressure "Ps21" and the initial pressure "Pf2", as shown in FIG. 6. More exactly, the second reference pressure "Ps22" corresponds to such a pressure, which cannot be obtained even by pressurizing the inside space of the fuel tank 8 for the second pressurizing time, due to a situation that the fuel tank 8 has such a leakage hole extremely larger than the predetermined leakage value.

When the control unit 19 determines that the first sensor value is smaller (lower) than the second reference pressure "Ps22" (YES at the step S214), the detection process goes to a step S215. At the step S215, the control unit 19 determines that the fuel tank 8 has the leakage hole (the first leakage hole) extremely larger than the predetermined leakage value or determines that the second purge pipe unit 11 is blocked up. In other words, the control unit 19 determines that there is "a large leakage condition" or "a blocked-up condition".

When the control unit 19 determines that the first sensor value is larger (higher) than the second reference pressure "Ps22" (NO at the step S214), the detection process goes to a step S216. At the step S216, the control unit 19 determines that the fuel tank 8 has the leakage hole (the second leakage hole) slightly larger than the predetermined leakage value. In other words, the control unit 19 determines that there is "the small leakage" of the fuel vapor.

The detection process for the leakage of the fuel vapor of this cycle is once terminated after the determination at the step S215 or S216.

As explained above, the vaporized fuel processing apparatus 2 of the present embodiment has the first pump 29, which can pressurize the inside space of the fuel tank 8. According to the vaporized fuel processing apparatus 2, after the inside space of the fuel tank 8 is pressurized, the control unit 19 determines whether there is the leakage of the fuel vapor or the blocked-up condition of the second purge pipe unit 11 based on the comparison result between the first sensor value and the first reference pressure "Ps21" or between the first sensor value and the second reference pressure "Ps22". More detailed explanation for such determination will be made hereinafter with reference to FIG. 6.

When the inside space of the fuel tank 8 is pressurized by the first pump 29 at the timing "t206" and then the operation of the first pump 29 is stopped at the timing "t208", the first sensor value changes with the passage of time, as indicated by respective solid lines L21, L22, L23, L24 and L25 in FIG. 6.

In a case that the first sensor value changes along the solid line L21 of FIG. 6, the first sensor value becomes a value almost equal to the predetermined tank pressure "Pr2" when the second predetermined time (from the timing "t206" to the timing "t209") has passed over (YES at each of the steps S209 and S210). In this case, it is so considered that there is no leakage of the fuel vapor from the fuel tank 8 and the fuel tank 8 does not have the leakage hole larger than the predetermined leakage value. Therefore, the control unit 19 determines that there is "no leakage" of the fuel vapor from the fuel tank 8 (the step S211).

In a case that the first sensor value changes along the solid line L22 of FIG. 6, the first sensor value is larger (higher) than the first reference pressure "Ps21" at the timing "t209" (YES at the step S209) when the second predetermined time has passed over (YES at the step S210). In this case, it is so considered that the leakage amount of the fuel vapor from the fuel tank 8 is relatively small and the fuel tank 8 does not have the leakage hole larger than the predetermined leakage value. Therefore, the control unit 19 likewise determines that there is no substantial leakage (belonging to "no leakage") of the fuel vapor from the fuel tank 8 (the step S211).

In a case that the first sensor value changes along the solid line L23 of FIG. 6, the first sensor value is smaller (lower) than the first reference pressure "Ps21" but larger (higher) than the second reference pressure "Ps22" at the timing "t209" when the second predetermined time has passed over. In this case, it is so considered that the leakage amount of the fuel vapor from the fuel tank 8 is slightly larger than the predetermined leakage amount and the fuel tank 8 has the leakage hole (the second leakage hole) slightly larger than the predetermined leakage value. Therefore, the control unit 19 determines that there is "the small leakage" of the fuel vapor from the fuel tank 8 (the step S212).

In a case that the first sensor value changes along the solid line L24 of FIG. 6, the first sensor value does not reach the predetermined tank pressure "Pr2" (NO at the step S207) and becomes such a value larger (higher) than the second reference pressure "Ps22" (NO at the step S214) but smaller (lower) than the first reference pressure "Ps21" at the timing "t209" when the second predetermined time has passed over. In this case, it is also so considered that the fuel tank 8 has the leakage hole (the second leakage hole) slightly larger than the predetermined leakage value. Therefore, the control unit 19 determines that there is "the small leakage" of the fuel vapor from the fuel tank 8 (the step S216).

In a case that the first sensor value changes along the solid line L25 of FIG. 6, the first sensor value does not reach the predetermined tank pressure "Pr2" (NO at the step S207) and becomes such a value smaller (lower) than the second reference pressure "Ps22" (YES at the step S214) at the timing "t209" when the second predetermined time has passed over. In this case, the first sensor value corresponding to the pressure in the canister 10 does not largely change from the initial pressure "Pf2". It is, therefore, so considered that the fuel tank 8 has the leakage hole (the first leakage hole) extremely larger than the predetermined leakage value or the second purge pipe unit 11 is blocked up. Therefore, the control unit 19 determines that there is "the large leakage" of the fuel vapor from the fuel tank 8 or "the blocked-up condition" in the second purge pipe unit 11 (the step S215).

As above, according to the vaporized fuel processing apparatus 2 of the present embodiment, the control unit 19 can determine not only the leakage of the fuel vapor from the fuel tank 8 but also the blocked-up condition of the second purge pipe unit 11 based on the comparison result between the first sensor value and the first reference pressure "Ps21" and between the first sensor value and the second reference pressure "Ps22", after the inside space of the fuel tank 8 is pressurized by the first pump 29.

Third Embodiment

A vaporized fuel processing apparatus 3 according to a third embodiment of the present disclosure will be explained with reference to FIGS. 7 and 8 as well as FIGS. 9A to 9C. The third embodiment differs from the first embodiment in that a second pressure sensor 39 is provided in the vaporized fuel processing apparatus 3 for detecting the inside pressure of the fuel tank 8.

Figure 7:
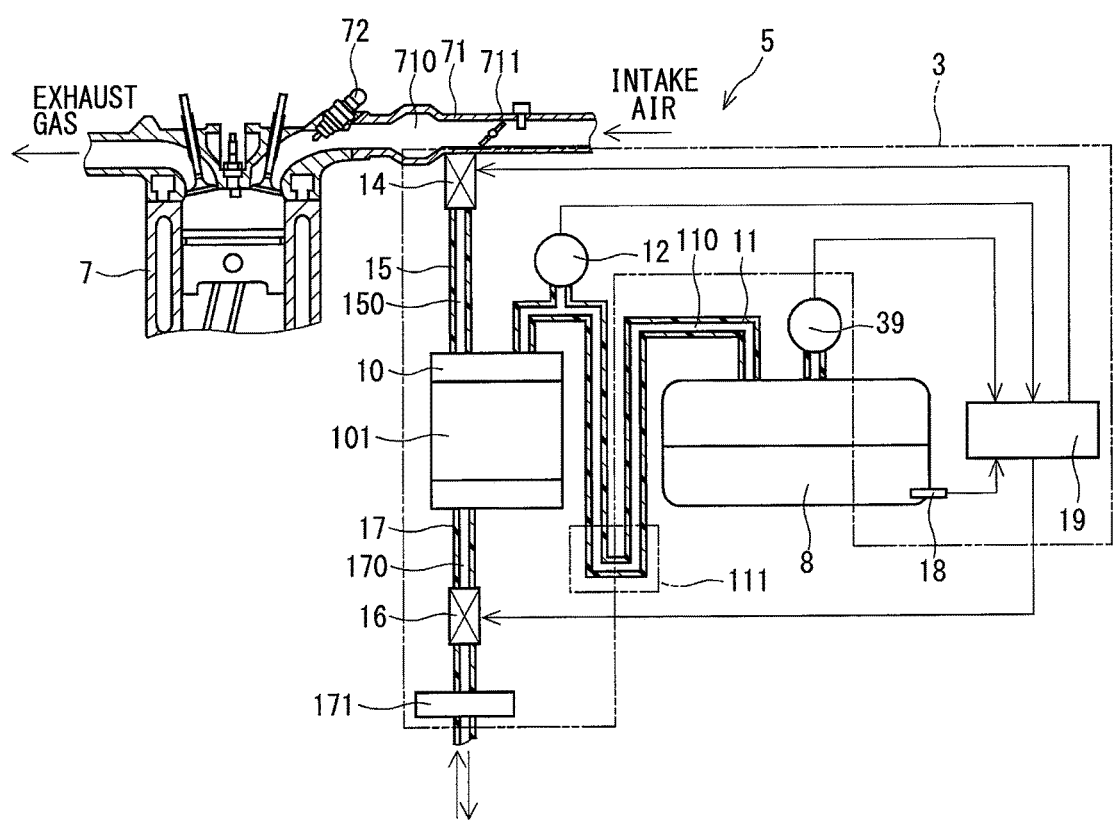
FIG. 7 is a schematic view showing a vaporized fuel processing apparatus according to a third embodiment of the present disclosure.

FIG. 7 schematically shows a structure of the vaporized fuel processing apparatus 3 of the third embodiment, which is composed of the canister 10, the first pressure sensor 12, the purge valve 14, the atmospheric valve 16, the fuel temperature sensor 18, the second pressure sensor 39 (a second pressure sensing device), the control unit 19 and so on.

The second pressure sensor 39 is attached to the fuel tank 8 and electrically connected to the control unit 19 in order to output an electrical signal depending on a detected pressure of the fuel tank 8 to the control unit 19.

A process for detecting the leakage of the fuel vapor in the vaporized fuel processing apparatus 3 will be explained with reference to FIGS. 8 and 9A to 9C. FIG. 8 is a flow chart showing a detection process for the leakage of the fuel vapor. FIGS. 9A to 9C are time charts showing characteristics for the detection process. In the present embodiment, the detection process of FIG. 8 is arbitrarily carried out.

Figure 8:
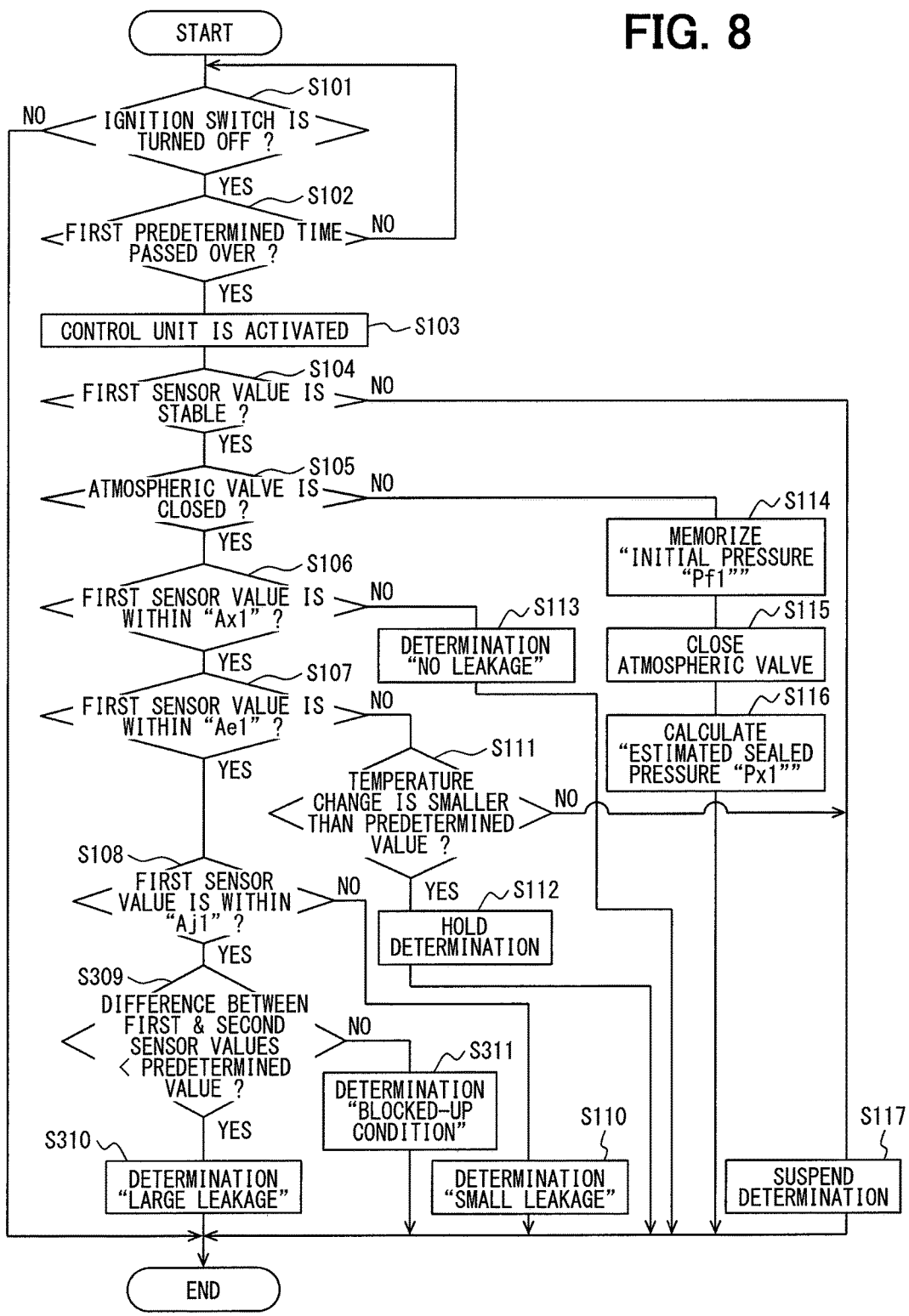
FIG. 8 is a flow chart showing a detection process for leakage of fuel vapor, which is carried out by the vaporized fuel processing apparatus according to the third embodiment.

The steps S101 to S108 as well as the steps S110 to S117 of the detection process in FIG. 8 are identical to those (S101 to S108 and S110 to S117) of the detection process of the vaporized fuel processing apparatus 1 shown in FIG. 2.

When the control unit 19 determines at the step S108 that the first sensor value is within the second pressure range "Aj1" for the leakage determination pressure (YES at the step S108), the control unit 19 determines at a step S309 whether a difference between the first sensor value and a second sensor value is smaller than a predetermined value or not, wherein the second sensor value corresponds to a second pressure value detected by the second pressure sensor 39.

The determination at the step S309 will be further explained with reference to FIGS. 9A to 9C.

Figure 9A:
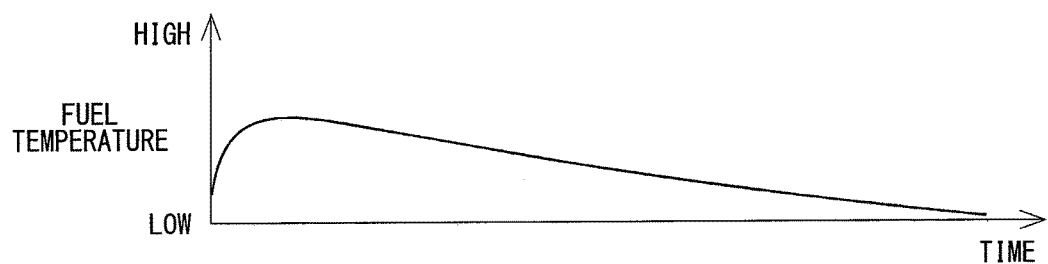
FIGS. 9A to 9C are time charts showing characteristics for the detection process of the third embodiment.
Figure 9B:
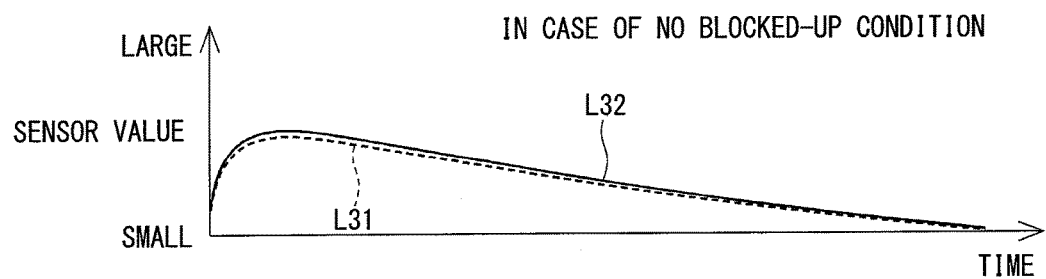

FIG. 9A shows a change of the fuel temperature in the fuel tank 8 with the passage of time. FIG. 9B shows changes of the first and second sensor values with the passage of time, in a case that the second purge pipe unit 11 is not blocked up. FIG. 9C shows the changes of the first and second sensor values with the passage of time, in a case that the second purge pipe unit 11 is blocked up. In each of FIGS. 9B and 9C, the first sensor value is indicated by a dotted line L31 and the second sensor value is indicated by a solid line L32.

As shown in FIG. 9A, when the fuel temperature in the fuel tank 8 is decreased with the passage of time, each of the first and second sensor values is correspondingly decreased with the passage of time. In a case that the first sensor value and the second sensor value are decreased in the same manner to each other with the passage of time, as shown in FIG. 9B, it is so considered that the fuel tank 8 and the canister 10 are communicated to each other. In other words, it can be so determined that the second purge pipe unit 11 is not blocked up.

Figure 9C:
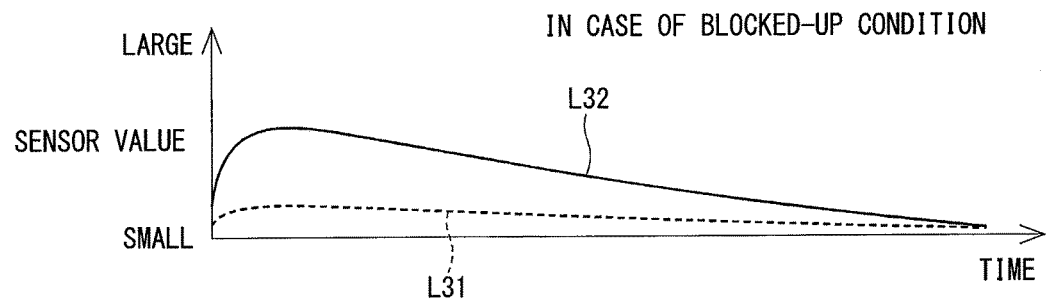

On the other hand, as shown in FIG. 9C, when the first sensor value is smaller than the second sensor value, it is so considered that the fuel vapor generated in the fuel tank 8 cannot flow from the fuel tank 8 into the canister 10. In other words, it can be so determined that the fuel tank 8 and the canister 10 are not fully communicated to each other. Namely, it is estimated that the second purge pipe unit 11 is blocked up.

As above, the control unit 19 determines at the step S309 whether the second purge pipe unit 11 is blocked up or not based on a comparison between the first sensor value and the second sensor value.

When the control unit 19 determines at the step S309 that the difference between the first sensor value and the second sensor value is smaller than the predetermined value, the detection process goes to a step S310. At the step S310, the control unit 19 determines that there is "the large leakage" of the fuel vapor in the fuel tank 8.

On the other hand, when the control unit 19 determines at the step S309 that the difference between the first sensor value and the second sensor value is larger than the predetermined value, the process goes to a step S311. At the step S311, the control unit 19 determines that the second purge pipe unit 11 is blocked up.

According to the vaporized fuel processing apparatus 3 of the present embodiment, there are provided with the first pressure sensor 12 for detecting the inside pressure of the canister 10 and the second pressure sensor 39 for detecting the inside pressure of the fuel tank 8. According to the above structure, the control unit 19 can determine either that the fuel tank 8 has the leakage hole (the first leakage hole) extremely larger than the predetermined leakage value or that the second purge pipe unit 11 is blocked up, based on the comparison between the first and the second sensor values when the first sensor value is within the second pressure range "Aj1" for the leakage determination pressure. Accordingly, it is possible in the third embodiment to further improve the determination accuracy for the leakage of the fuel vapor of the fuel tank 8 and the blocked-up condition of the second purge pipe unit 11.

Fourth Embodiment

A vaporized fuel processing apparatus 4 according to a fourth embodiment of the present disclosure will be explained with reference to FIG. 10 and FIGS. 11A to 11C. The fourth embodiment differs from the first embodiment in that two pumps (a first pump 29 and a second pump 49) are provided in the vaporized fuel processing apparatus 4 of the fourth embodiment.

Figure 10:
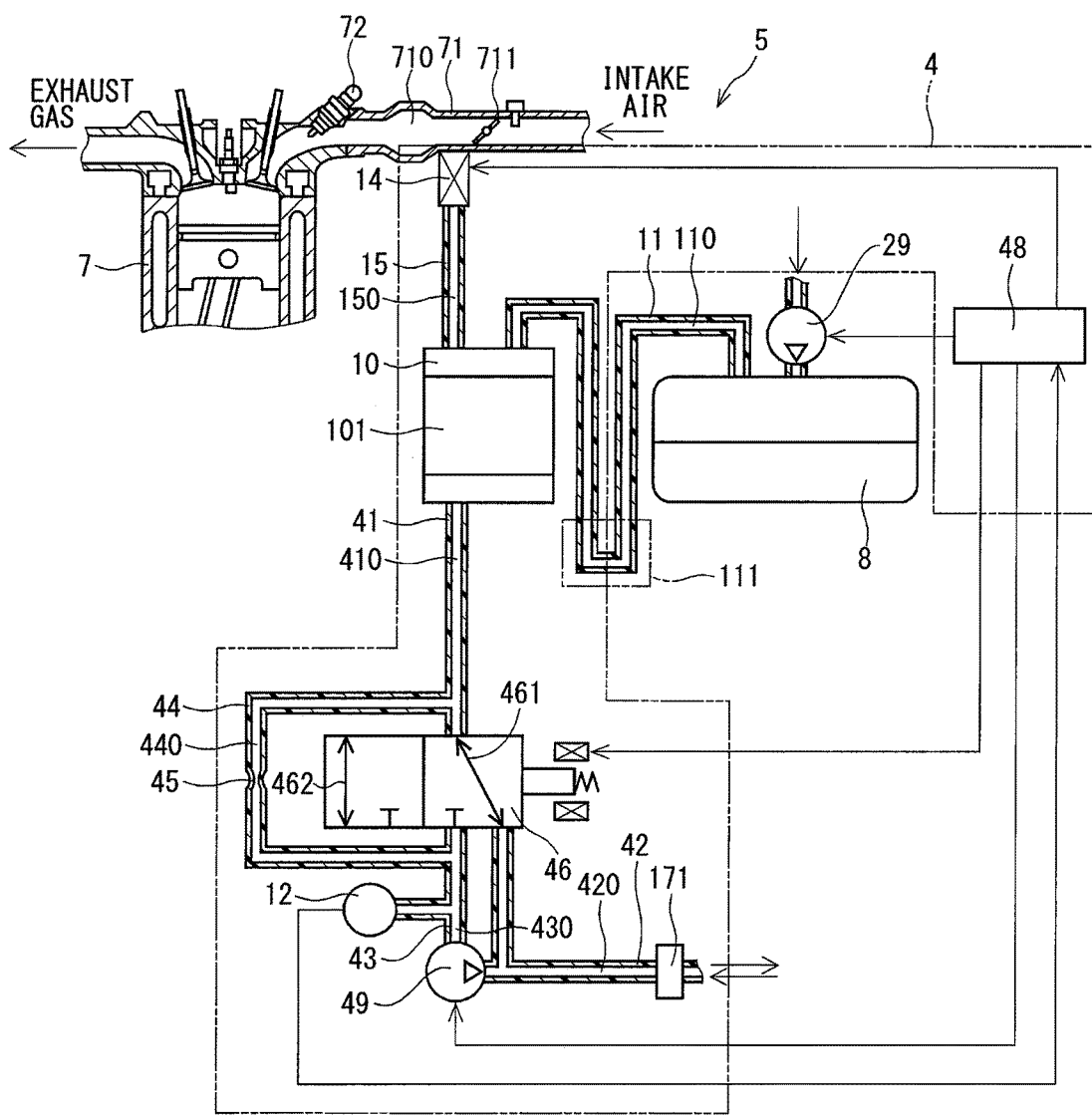
FIG. 10 is a schematic view showing a vaporized fuel processing apparatus according to a fourth embodiment of the present disclosure.

FIG. 10 schematically shows a structure of the vaporized fuel processing apparatus 4 of the fourth embodiment, which is composed of the canister 10, the first pressure sensor 12, the purge valve 14, an atmospheric valve 46, the first pump 29, the second pump 49, a control unit 48 and so on.

The atmospheric valve 46 is provided between a first atmospheric pipe 41 and a second atmospheric pipe 42. The first atmospheric pipe 41 has a first atmospheric passage 410 connected to the canister 10. The second atmospheric pipe 42 has a second atmospheric passage 420 communicated to the atmosphere. The atmospheric valve 46 switches over a passage for fluid passing through the atmospheric valve 46. More exactly, the atmospheric valve 46 has a first communication passage 461 and a second communication passage 462. The first communication passage 461 communicates the first atmospheric passage 410 to the second atmospheric passage 420. The second communication passage 462 communicates the first atmospheric passage 410 to a pressure detecting passage 430 of a pressure detecting pipe 43, in which the first pressure sensor 12 and the second pump 49 are provided. The atmospheric valve 46 is electrically connected to the control unit 48 and selectively connects the first atmospheric passage 410 either to the first communication passage 461 or to the second communication passage 462 depending on a command signal from the control unit 48.

The second pump 49 is communicated to the second atmospheric passage 420 and the pressure detecting passage 430. The second pump 49 depressurizes the inside space of the canister 10 via the pressure detecting passage 430.

The first pressure sensor 12 detects the inside pressure of the fuel tank 8 via the pressure detecting passage 430.

The atmospheric filter 171 is provided in the second atmospheric pipe 42.

A bypass pipe 44 having a bypass passage 440 is provided between the first atmospheric pipe 41 and the pressure detecting pipe 43, wherein the bypass passage 440 communicates the first atmospheric passage 410 to the pressure detecting passage 430 without passing through the atmospheric valve 46. A reference orifice 45 is provided in the bypass pipe 44.

The control unit 48 is composed of a micro-computer having CPU as a calculation portion, RAM and ROM as memory portions and so on. The control unit 48 is electrically connected to the first pressure sensor 12, the purge valve 14, the atmospheric valve 46, and the second pump 49. The control unit 48 controls the operations of the purge valve 14 and the atmospheric valve 46 based on the electrical signals outputted from the first pressure sensor 12. The control unit 48 further controls the operations of the first pump 29 and the second pump 49.

Figure 11A:
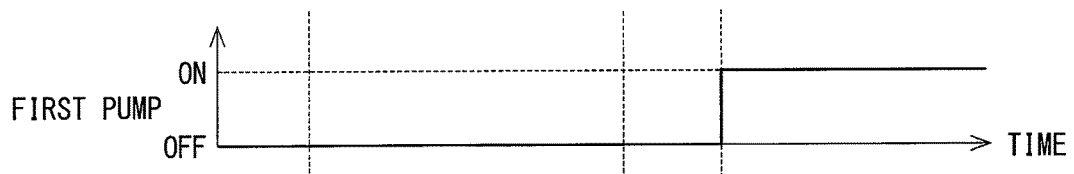
FIGS. 11A to 11C are time charts showing characteristics for the detection process of the fourth embodiment of the present disclosure.
Figure 11B:
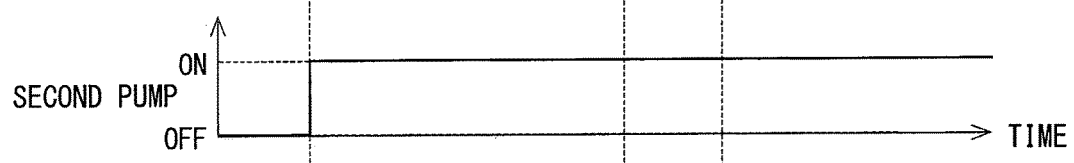
Figure 11C:
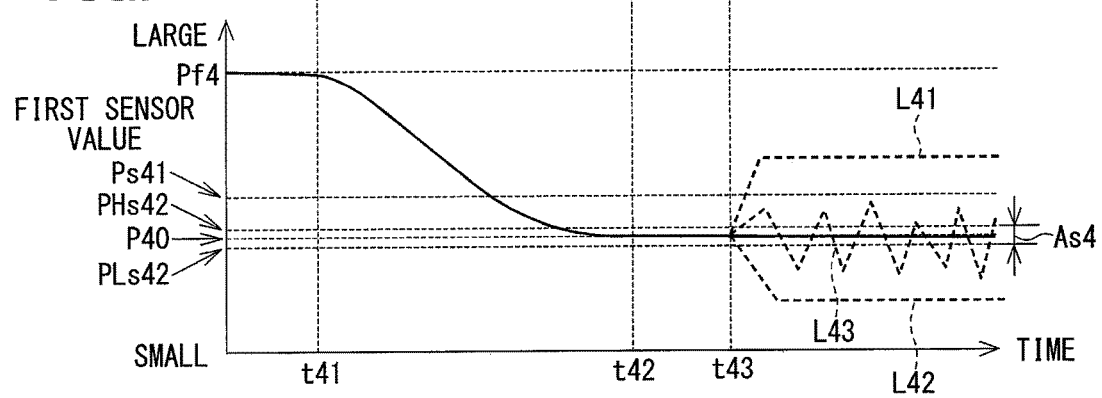

A process for detecting the leakage of the fuel vapor, which is carried out by the vaporized fuel processing apparatus 4, will be explained with reference to FIGS. 11A to 11C. FIGS. 11A to 11C are time charts showing characteristics for the detection process. In the present embodiment, the detection process of the vaporized fuel processing apparatus 4 is carried out, after a predetermined time has passed over since the operation of the engine 7 is stopped.

When the predetermined time has passed over since the operation of the engine 7 is stopped, the control unit 48 is activated by a soak timer (not shown). At first, the atmospheric pressure is detected. In a condition of FIG. 10, the inside space of the fuel tank 8 is communicated to the atmosphere via the first communication passage 461 of the atmospheric valve 46. The first atmospheric passage 410 is communicated to the pressure detecting passage 430 via the bypass passage 440. Since the pressure detecting passage 430 is communicated to the atmosphere, the first pressure sensor 12 detects the atmospheric pressure as an initial pressure "Pf4".

When the second pump 49 is operated at a timing "t41", as shown in FIG. 11B, an inside of the pressure detecting passage 430 is depressurized. When the inside of the pressure detecting passage 430 is depressurized, the atmosphere flows into the pressure detecting passage 430 via the second atmospheric passage 420, the first communication passage 461 of the atmospheric valve 46, the first atmospheric passage 410 and the bypass passage 440. Since the atmosphere flowing into the pressure detecting passage 430 is restricted by the reference orifice 45, the pressure in the pressure detecting passage 430 becomes lower than the atmospheric pressure. The pressure in the pressure detecting passage 430 is decreased to a predetermined pressure, which is defined by the reference orifice 45, and then the pressure in the pressure detecting passage 430 becomes constant. The detected pressure of the pressure detecting passage 430 is memorized as a first reference pressure "Ps41".

When the first reference pressure "Ps41" is memorized, the atmospheric valve 46 blocks off the communication between the first atmospheric passage 410 and the second atmospheric passage 420 and switches to the communication between the first atmospheric passage 410 and the pressure detecting passage 430 via the second communication passage 462. When the first atmospheric passage 410 is communicated to the pressure detecting passage 430, the pressure in the pressure detecting passage 430 becomes equal to the inside pressure of the fuel tank 8.

When the first atmospheric passage 410 is communicated to the pressure detecting passage 430, the inside spaces of the canister 10 and the fuel tank 8 are depressurized by the operation of the second pump 49. In a case that the first sensor value becomes smaller (lower) than the first reference pressure "Ps41" by the operation of the second pump 49, the control unit 48 determines that the fuel tank 8 does not have the leakage hole larger than the predetermined leakage value. In other words, the control unit 48 determines that there is "no leakage" of the fuel vapor.

On the other hand, in a case that the first sensor value becomes equal to or larger (higher) than the first reference pressure "Ps41" despite of the operation of the second pump 49, the control unit 48 determines that the fuel tank 8 has the leakage hole larger than the predetermined leakage value. In other words, the control unit 48 determines that there is "a leakage condition" of the fuel vapor.

The first pump 29 is operated after the first sensor value becomes stable. In this case, the first pump 29 may either pressurize or depressurize the inside space of the fuel tank 8. Alternatively, the first pump 29 may alternately repeat pressurization and depressurization. In other words, pressure change is intentionally applied to the inside pressure of the fuel tank 8 by the operation of the first pump 29. The control unit 48 determines whether the second purge pipe unit 11 is blocked up or not, based on a size of the variation of the first sensor value. More detailed explanation for the determination will be made with reference to FIGS. 11A to 11C.

FIGS. 11A to 11O show the operations of the first and the second pumps 29 and 49 as well as changes of the first sensor value with the passage of time after the second pump 49 is operated.

When the second pump 49 is operated at the timing "t41", the first sensor value is gradually decreased from the atmospheric pressure "Pf4" (the initial pressure).

In a case that the first sensor value becomes stable at a value smaller than the first reference pressure "Ps41", the control unit 48 determines that there is no leakage of the fuel vapor. In this case, the first sensor value becomes a stabilized pressure value "P40" at a timing "t42".

A reference value "PHs42" of a high-pressure side (hereinafter, the high-pressure side reference value "PHs42") is set at a value higher than the stabilized pressure value "P40", while a reference value "PLs42" of a low-pressure side (hereinafter, the low-pressure side reference value "PLs42") is set at a value lower than the stabilized pressure value "P40". The high-pressure side reference value "PHs42" and the low-pressure side reference value "PLs42" are collectively referred to as a second reference pressure. The high-pressure side reference value "PHs42" is an upper limit value of a predetermined pressure range "As4" including the stabilized pressure value "P40", while the low-pressure side reference value "PLs42" is a lower limit value of the predetermined pressure range "As4" including the stabilized pressure value "P40".

When the first pump 29 is operated at a timing "t43", the first sensor value varies depending on an operating manner of the first pump 29. The control unit 48 determines whether the first sensor value is within the predetermined pressure range "As4" or not, which corresponds to a range between the high-pressure side reference value "PHs42" and the low-pressure side reference value "PLs42", to thereby determine whether the second purge pipe unit 11 is blocked up or not.

More exactly, when the first pump 29 pressurizes the inside space of the fuel tank 8, the first sensor value becomes larger (higher) than the stabilized pressure value "P40". In a case that the first sensor value becomes larger (higher) than the second reference pressure "PHs42" of the high-pressure side, that is, the first sensor value is outside of the predetermined pressure range "As4" on the high-pressure side, as indicated by a dotted line "L41" in FIG. 11C, the control unit 48 determines that there is no blocked-up condition in the second purge pipe unit 11.

When the first pump 29 depressurizes the inside space of the fuel tank 8, the first sensor value becomes lower than the stabilized pressure value "P40". In a case that the first sensor value becomes smaller (lower) than the second reference pressure "PLs42" of the low-pressure side, that is, the first sensor value is outside of the predetermined pressure range "As4" on the low-pressure side, as indicated by a dotted line "L42" in FIG. 11C, the control unit 48 also determines that there is no blocked-up condition in the second purge pipe unit 11.

When the first pump 29 repeats the pressurization and the depressurization for the inside space of the fuel tank 8, the first sensor value varies in a pulsating manner with respect to the stabilized pressure value "P40". In a case that the first sensor value temporarily becomes larger (higher) than the second reference pressure "PHs42" of the high-pressure side or smaller (lower) than the second reference pressure "PLs42" of the low-pressure side, that is, the first sensor value is temporarily outside of the predetermined pressure range "As4", as indicated by a dotted line "L43" in FIG. 11C, the control unit 48 also determines that there is no blocked-up condition in the second purge pipe unit 11.

However, in a case that the first sensor value stays within the predetermined pressure range "As4", the control unit 48 determines that the second purge pipe unit 11 is blocked up.

According to the vaporized fuel processing apparatus 4 of the present embodiment, the inside pressure of the fuel tank 8 is intentionally changed by the first pump 29 after the inside pressure of the canister 10 becomes stable. Then, the control unit 48 determines whether the pressure variation of the inside pressure of the fuel tank 8 is within the predetermined pressure range "As4" or not, to thereby determine whether the second purge pipe unit 11 is blocked up or not. As above, in the vaporized fuel processing apparatus 4, which has the first pressure sensor 12, the first pump 29 and the second pump 49, the control unit 48 determines not only the leakage of the fuel vapor but also the blocked-up condition of the second purge pipe unit 11.

MODIFICATIONS

In the above first to third embodiments, the first pressure sensor 12 is provided in the second purge pipe unit 11 at such a position, which is closer to the canister 10 than the vertical lower portion 111. The position for the first pressure sensor 12 is not limited to the above position. The first pressure sensor 12 may be provided in the first purge pipe unit 15 at a position between the canister 10 and the purge valve 14. Alternatively, the first pressure sensor 12 may be provided in the atmospheric pipe unit 17 at a position between the canister 10 and the atmospheric valve 16. In the case of the fourth embodiment, the first pressure sensor 12 may be provided in the first atmospheric pipe 41 at a position between the canister 10 and the atmospheric valve 46.

In the above embodiments, the portion (that is, the vertical lower portion 111) at which the blocked-up condition is likely to occur is explained as such a position, which is vertically lower than the fuel tank 8 and at which the liquid fuel is likely to accumulate or remain. However, the portion at which the blocked-up condition is likely to occur is not limited to the above position. In a case that a check valve or a tank blocking valve, which cuts off the communication between the fuel tank and the canister, is provided in the second purge pipe unit, a valve body thereof may become the portion at which the blocked-up condition is likely to occur when the valve body is stuck to any part of a valve seat or the like.

In the above first to third embodiments, the control unit 19 calculates the estimated sealed pressure based on the map prepared in advance as well as the fuel temperature in the fuel tank 8. However, the method for calculating the estimated sealed pressure is not limited to the above method. The control unit may calculate the estimated sealed pressure based on an ambient temperature surrounding the vehicle or an elapsed time.

In the above first to third embodiments, the fuel temperature sensor 18 detects the fuel temperature in the fuel tank 8. However, the method for detecting the fuel temperature is not limited to the above method. In a case that an intake-air temperature sensor, a vehicle outside temperature sensor, a canister temperature sensor, an exhaust gas temperature sensor or the like is provided, the fuel temperature in the fuel tank can be calculated based on a detection result of such a temperature sensor. Alternatively, the fuel temperature in the fuel tank can be calculated based on a travel distance of the vehicle, an elapsed time after the ignition switch is turned off, a time period during which the engine is continuously operated, or the like.

In the above first embodiment, the variation of the first sensor value is explained in the condition that the fuel temperature is gradually decreased. However, the detection process for the leakage of the fuel vapor can be carried out in a similar manner, when the fuel temperature is gradually increased.

More exactly, in the condition that the fuel temperature is gradually increased, the control unit 19 determines that there is no leakage of the fuel vapor in the fuel tank 8 when the first sensor value at the timing "t106" of FIG. 3 is larger than the high-pressure side estimated sealed pressure "PHx1".

The control unit 19 suspends the determination for the leakage of the fuel vapor, when the first sensor value at the timing "t106" is smaller than the high-pressure side estimated sealed pressure "PHx1" but larger than the high-pressure side error determination pressure "PHe1".

The control unit 19 determines that there is the small leakage of the fuel vapor, when the first sensor value at the timing "t106" is smaller than the high-pressure side error determination pressure "PHe1" but larger than the high-pressure side leakage determination pressure "PHj1".

The control unit 19 determines that there is the large leakage of the fuel vapor in the fuel tank 8 or there is the blocked-up condition in the second purge pipe unit 11, when the first sensor value at the timing "t106" is smaller than the high-pressure side leakage determination pressure "PHj1".

In the above second or fourth embodiment, the inside space of the fuel tank 8 is pressurized by the first pump 29. However, the method for pressurizing the inside space of the fuel tank 8 is not limited to the above method. For example, the inside space of the fuel tank 8 may be pressurized by use of a fuel pump for supplying the fuel to the fuel injection valve and a jet pump provided in the fuel tank, by supplying into the fuel tank a part of compressed air accumulated in a container separately provided from the fuel tank, by heating the fuel tank and so on.

In the above fourth embodiment, the control unit 48 determines, by operating the second pump 49, that the fuel tank does not have the leakage hole larger than the predetermined leakage value and the control unit 48 determines that there is "no leakage" of the fuel vapor. After the above determination, the control unit 48 determines the blocked-up condition for the second purge pipe unit 11 by applying the pressure change to the inside space of the fuel tank 8 by the first pump 29.

However, the control unit 48 may determine the blocked-up condition for the second purge pipe unit 11 by applying the pressure change by the first pump 29, after the control unit determines by operating the second pump 49 that there is the leakage of the fuel vapor. In this case, each of the high-pressure side reference value "PHs42" and the low-pressure side reference value "PLs42" may be set at such a value in the following manner. At first, the first sensor value is detected in a condition that the first sensor value is stabilized during the second pump 49 is operated. The first sensor value becomes constant at a stabilized pressure value, which is higher than the first reference pressure "Ps41". Then, the second reference pressure "PHs42" of the high-pressure side is set at a value larger than the stabilized pressure value, while the second reference pressure "PLs42" of the low-pressure side is set at a value smaller than the stabilized pressure value.

The present disclosure is not limited to the above embodiments and/or the modifications but can be further modified in various manners without departing from a spirit of the present disclosure.

What is claimed is:

1. A vaporized fuel processing apparatus for a vehicle, which has an internal combustion engine and a fuel tank for storing fuel, wherein vaporized fuel generated in the fuel tank is supplied into an intake system of the internal combustion engine, and wherein the vaporized fuel processing apparatus comprises:
   a canister for absorbing the vaporized fuel generated in the fuel tank;
   a first pressure detecting device for detecting pressure inside of the canister and generating an output signal having a first sensor value depending on a detected inside pressure of the canister;
   a first purge pipe unit having a first purge passage for operatively communicating the canister to the intake system;
   a purge valve provided in the first purge pipe unit for operatively opening or closing the first purge passage;
   a second purge pipe unit having a second purge passage for communicating the canister to the fuel tank;
   an atmospheric pipe unit having an atmospheric passage for operatively communicating the canister to the atmosphere;
   an atmospheric valve provided in the atmospheric pipe unit for operatively opening or closing the atmospheric passage; and
   a control unit electrically connected to the first pressure detecting device, the purge valve and the atmospheric valve for controlling an opening or closing operation of each of the purge valve and the atmospheric valve,
   wherein the control unit determines not only a leakage of the vaporized fuel generated in the fuel tank but also a blocked-up condition of the second purge passage, based on comparison results between the first sensor value and two reference pressures,
   wherein the first sensor value corresponds to the detected inside pressure of the canister, which is detected by the first pressure detecting device when the canister is blocked off not only from the intake system but also from the atmosphere, and
   wherein the first pressure detecting device is provided in the second purge pipe unit at such a position closer to the canister than a part of the second purge passage, at which the blocked-up condition is likely to occur.

2. A vaporized fuel processing apparatus for a vehicle, which has an internal combustion engine and a fuel tank for storing fuel, wherein vaporized fuel generated in the fuel tank is supplied into an intake system of the internal combustion engine, and wherein the vaporized fuel processing apparatus comprises:
   a canister for absorbing the vaporized fuel generated in the fuel tank;
   a first pressure detecting device for detecting pressure inside of the canister and generating an output signal having a first sensor value depending on a detected inside pressure of the canister;
   a first purge pipe unit having a first purge passage for operatively communicating the canister to the intake system;
   a purge valve provided in the first purge pipe unit for operatively opening or closing the first purge passage;
   a second purge pipe unit having a second purge passage for communicating the canister to the fuel tank;
   an atmospheric pipe unit having an atmospheric passage for operatively communicating the canister to the atmosphere;
   an atmospheric valve provided in the atmospheric pipe unit for operatively opening or closing the atmospheric passage; and
   a control unit electrically connected to the first pressure detecting device, the purge valve and the atmospheric valve for controlling an opening or closing operation of each of the purge valve and the atmospheric valve,
   wherein the control unit determines not only a leakage of the vaporized fuel generated in the fuel tank but also a blocked-up condition of the second purge passage, based on comparison results between the first sensor value and two reference pressures, and
   wherein the first sensor value corresponds to the detected inside pressure of the canister, which is detected by the first pressure detecting device when the canister is blocked off not only from the intake system but also from the atmosphere,
   wherein the control unit determines that the fuel tank does not have a leakage hole larger than a predetermined leakage value, when a difference between the first sensor value and an initial pressure is larger than a difference between a first reference pressure and the initial pressure, wherein the first sensor value corresponds to the pressure inside the canister, which is detected when temperature of the fuel in the fuel tank is changed, wherein the initial pressure corresponds to the pressure inside the canister, which is detected by the first pressure detecting device when the canister is communicated to the atmosphere, wherein the first reference pressure is one of the two reference pressures and corresponds to such a pressure, which is estimated as an estimated pressure to be detected by the first pressure detecting device when the canister is blocked off not only from the intake system but also from the atmosphere, in a condition that the fuel tank does not have the leakage hole larger than the predetermined leakage value and the second purge passage has no blocked-up condition, and the control unit further determines that the fuel tank has a first leakage hole larger than the predetermined leakage value or the second purge passage is in the blocked-up condition, when the difference between the first sensor value and the initial pressure is smaller than a difference between a second reference pressure and the initial pressure, wherein the second reference pressure is another one of the two reference pressures and corresponds to such a pressure, which is set at a value between the first reference pressure and the initial pressure.

3. The vaporized fuel processing apparatus according to claim 2, wherein the control unit further determines whether there is the leakage of the vaporized fuel generated in the fuel tank or not based on a third reference pressure, when the difference between the first sensor value and the initial pressure is smaller than the difference between the first reference pressure and the initial pressure but larger than the difference between the second reference pressure and the initial pressure, wherein the third reference pressure is set at a value between the first reference pressure and the second reference pressure.

4. The vaporized fuel processing apparatus according to claim 3, wherein the control unit determines that the fuel tank has a second leakage hole, which is larger than the predetermined leakage value but smaller than the first leakage hole, when the difference between the first sensor value and the initial pressure is smaller than a difference between the third reference pressure and the initial pressure and when the difference between the first sensor value and the initial pressure is larger than the difference between the second reference pressure and the initial pressure.

5. The vaporized fuel processing apparatus according to claim 2, further comprising:

a second pressure detecting device for detecting pressure inside of the fuel tank and generating an output signal depending on a detected inside pressure of the fuel tank, wherein the control unit determines whether there is the blocked-up condition in the second purge passage or not based on a comparison between a second sensor value detected by the second pressure detecting device and the first sensor value.

6. The vaporized fuel processing apparatus according to claim 5, wherein the control unit determines that the fuel tank has the first leakage hole, when a difference between the first sensor value and the second sensor value is smaller than a predetermined value, wherein the first sensor value corresponds to the pressure inside the canister, which is detected by the first pressure detecting device, when a predetermined time has passed over after the canister is blocked off not only from the intake system but also from the atmosphere, and the control unit determines that there is the blocked-up condition in the second purge passage, when the difference between the first sensor value and the second sensor value is larger than the predetermined value.

7. The vaporized fuel processing apparatus according to claim 1, further comprising:

a first pressure changing unit for pressurizing or depressurizing an inside space of the fuel tank, wherein the control unit is electrically connected to the first pressure changing unit to control an operation of the first pressure changing unit.

8. A vaporized fuel processing apparatus for a vehicle, which has an internal combustion engine and a fuel tank for storing fuel, wherein vaporized fuel generated in the fuel tank is supplied into an intake system of the internal combustion engine, and wherein the vaporized fuel processing apparatus comprises:

a canister for absorbing the vaporized fuel generated in the fuel tank;

a first pressure detecting device for detecting pressure inside of the canister and generating an output signal having a first sensor value depending on a detected inside pressure of the canister;

a first purge pipe unit having a first purge passage for operatively communicating the canister to the intake system;

a purge valve provided in the first purge pipe unit for operatively opening or closing the first purge passage;

a second purge pipe unit having a second purge passage for communicating the canister to the fuel tank;

an atmospheric pipe unit having an atmospheric passage for operatively communicating the canister to the atmosphere;

an atmospheric valve provided in the atmospheric pipe unit for operatively opening or closing the atmospheric passage; and a control unit electrically connected to the first pressure detecting device, the purge valve and the atmospheric valve for controlling an opening or closing operation of each of the purge valve and the atmospheric valve, wherein the control unit determines not only a leakage of the vaporized fuel generated in the fuel tank but also a blocked-up condition of the second purge passage, based on comparison results between the first sensor value and two reference pressures, and wherein the first sensor value corresponds to the detected inside pressure of the canister, which is detected by the first pressure detecting device when the canister is blocked off not only from the intake system but also from the atmosphere, wherein the vaporized fuel processing apparatus further comprises a first pressure changing unit for pressurizing or depressurizing an inside space of the fuel tank, wherein the control unit is electrically connected to the first pressure changing unit to control an operation of the first pressure changing unit, wherein the control unit determines that the fuel tank does not have the leakage hole larger than the predetermined leakage value, when a difference between the first sensor value and an initial pressure is larger than a difference between a first reference pressure and the initial pressure, wherein the control unit determines that the fuel tank has a second leakage hole larger than the predetermined leakage value, when the difference between the first sensor value and the initial pressure is smaller than the difference between the first reference pressure and the initial pressure but larger than a difference between a second reference pressure and the initial pressure, and wherein the control unit determines that the fuel tank has a first leakage hole larger than the second leakage hole or the second purge passage is in the blocked-up condition, when the difference between the first sensor value and the initial pressure is smaller than the difference between the second reference pressure and the initial pressure, wherein the initial pressure corresponds to the pressure inside the canister, which is detected by the first pressure detecting device when the canister is communicated to the atmosphere, the first reference pressure is one of the two reference pressures and corresponds to such a pressure, which is set at a value between a predetermined tank pressure and the initial pressure, the second reference pressure is another one of the two reference pressures and corresponds to such a pressure, which is set at a value between the first reference pressure and the initial pressure, and the predetermined tank pressure corresponds to the pressure inside the canister, which is detected by the first pressure detecting device when the inside space of the fuel tank is pressurized or depressurized by the first pressure changing unit, in a condition that the canister is blocked off not only from the intake system but also from the atmosphere.

9. The vaporized fuel processing apparatus according to claim 1, wherein the atmospheric pipe unit comprises:
 a first atmospheric pipe having a first atmospheric passage communicated to the canister;
 a second atmospheric pipe having a second atmospheric passage communicated to the atmosphere;
 a pressure detecting pipe having a pressure detecting passage to be communicated to the atmosphere via the second atmospheric passage, wherein the first pressure detecting device is provided in the pressure detecting pipe, and wherein the atmospheric valve is provided between the first and the second atmospheric pipes and changes a first communication state between the first atmospheric passage and the second atmospheric passage to a second communication state between the first atmospheric passage and the pressure detecting passage, or vice versa;
 a bypass pipe having a bypass passage for bypassing the atmospheric valve and connecting the first atmospheric passage to the pressure detecting passage; and
 a reference orifice provided in the bypass pipe for defining a predetermined pressure, and wherein the vaporized fuel processing apparatus further comprising:

a first pressure changing unit for pressurizing or depressurizing an inside space of the fuel tank; and
 a second pressure changing unit provided in the pressure detecting pipe for pressurizing or depressurizing an inside space of the canister via the pressure detecting passage.

10. A vaporized fuel processing apparatus for a vehicle, which has an internal combustion engine and a fuel tank for storing fuel, wherein vaporized fuel generated in the fuel tank is supplied into an intake system of the internal combustion engine, and wherein the vaporized fuel processing apparatus comprises:

a canister for absorbing the vaporized fuel generated in the fuel tank;
 a first pressure detecting device for detecting pressure inside of the canister and generating an output signal having a first sensor value depending on a detected inside pressure of the canister;
 a first purge pipe unit having a first purge passage for operatively communicating the canister to the intake system;
 a purge valve provided in the first purge pipe unit for operatively opening or closing the first purge passage;
 a second purge pipe unit having a second purge passage for communicating the canister to the fuel tank;
 an atmospheric pipe unit having an atmospheric passage for operatively communicating the canister to the atmosphere;
 an atmospheric valve provided in the atmospheric pipe unit for operatively opening or closing the atmospheric passage; and
 a control unit electrically connected to the first pressure detecting device, the purge valve and the atmospheric valve for controlling an opening or closing operation of each of the purge valve and the atmospheric valve, wherein the control unit determines not only a leakage of the vaporized fuel generated in the fuel tank but also a blocked-up condition of the second purge passage, based on comparison results between the first sensor value and two reference pressures, and wherein the first sensor value corresponds to the detected inside pressure of the canister, which is detected by the first pressure detecting device when the canister is blocked off not only from the intake system but also from the atmosphere, wherein the atmospheric pipe unit comprises:
 a first atmospheric pipe having a first atmospheric passage communicated to the canister;
 a second atmospheric pipe having a second atmospheric passage communicated to the atmosphere;
 a pressure detecting pipe having a pressure detecting passage to be communicated to the atmosphere via the second atmospheric passage, wherein the first pressure detecting device is provided in the pressure detecting pipe, and wherein the atmospheric valve is provided between the first and the second atmospheric pipes and changes a first communication state between the first atmospheric passage and the second atmospheric passage to a second communication state between the first atmospheric passage and the pressure detecting passage, or vice versa;
 a bypass pipe having a bypass passage for bypassing the atmospheric valve and connecting the first atmospheric passage to the pressure detecting passage; and
 a reference orifice provided in the bypass pipe for defining a predetermined pressure, and wherein the vaporized fuel processing apparatus further comprises;
a first pressure changing unit for pressurizing or depressurizing an inside space of the fuel tank; and
a second pressure changing unit provided in the pressure detecting pipe for pressurizing or depressurizing an inside space of the canister via the pressure detecting passage,
wherein the two reference pressures have a first reference pressure and a second reference pressure, and the control unit determines that the second purge passage is in the blocked-up condition, when the first sensor value is within a predetermined pressure range defined by the second reference pressure,
wherein the first sensor value corresponds to the pressure inside the canister, which is detected by the first pressure detecting device in a condition that both of the first and the second pressure changing units are operated by the control unit,
wherein the first reference pressure corresponds to such a pressure inside the fuel tank, which is obtained when an inside space of the fuel tank is pressurized or depressurized in a case that the fuel tank has a leakage hole corresponding to a size of the reference orifice,
wherein the second reference pressure defines the predetermined pressure range by a high-pressure side reference value and a low-pressure side reference value,
wherein the high-pressure side reference value is set at a value higher than a stabilized pressure value, while the low-pressure side reference value is set at a value lower than the stabilized pressure value, and
wherein the stabilized pressure value corresponds to the pressure detected by the first pressure detecting device during the second pressure changing unit is operated.

11. A vaporized fuel processing apparatus for a vehicle, which has an internal combustion engine and a fuel tank for storing fuel, wherein vaporized fuel generated in the fuel tank is supplied into an intake system of the internal combustion engine, and wherein the vaporized fuel processing apparatus comprises:
a canister for absorbing the vaporized fuel generated in the fuel tank;
a first pressure detecting device for detecting pressure inside of the canister and generating an output signal having a first sensor value depending on a detected inside pressure of the canister;
a first purge pipe unit having a first purge passage for operatively communicating the canister to the intake system;
a purge valve provided in the first purge pipe unit for operatively opening or closing the first purge passage;
a second purge pipe unit having a second purge passage for communicating the canister to the fuel tank;
an atmospheric pipe unit having an atmospheric passage, for operatively communicating the canister to the atmosphere;
an atmospheric valve provided in the atmospheric pipe unit for operatively opening or closing the atmospheric passage; and
a control unit electrically connected to the first pressure detecting device, the purge valve and the atmospheric valve for controlling an opening or closing operation of each of the purge valve and the atmospheric valve,
wherein the control unit determines not only a leakage of the vaporized fuel generated in the fuel tank but also a blocked-up condition of the second purge passage, based on comparison results between the first sensor value and two reference pressures, and
wherein the first sensor value corresponds to the detected inside pressure of the canister, which is detected by the first pressure detecting device when the canister s blocked off not only from the intake system but also from the atmosphere,
wherein the atmospheric pipe unit comprises:
a first atmospheric pipe having a first atmospheric passage communicated to the canister;
a second atmospheric pipe having a second atmospheric passage communicated to the atmosphere;
a pressure detecting pipe having a pressure detecting passage to be communicated to the atmosphere via the second atmospheric passage, wherein the first pressure detecting device is provided in the pressure detecting pipe, and wherein the atmospheric valve is provided between the first and the second atmospheric pipes and changes a first communication state between the first atmospheric passage and the second atmospheric passage to a second communication state between the first atmospheric passage and the pressure detecting passage, or vice versa;
a bypass pipe having a bypass passage for bypassing the atmospheric valve and connecting the first atmospheric passage to the pressure detecting passage; and
a reference orifice provided in the bypass pipe for defining a predetermined pressure, and
wherein the vaporized fuel processing apparatus further comprises:
a first pressure changing unit for pressurizing or depressurizing an inside space of the fuel tank; and
a second pressure changing unit provided in the pressure detecting pipe for pressurizing or depressurizing an inside space of the canister via the pressure detecting passage,
wherein the two reference pressures have a first reference pressure and a second reference pressure, which includes a high-pressure side reference value and a low-pressure side reference value,
wherein the control unit determines that there is no leakage of the vaporized fuel, when the first sensor value becomes smaller than the first reference pressure in a condition that the inside space of the canister is depressurized by the second pressure changing unit, and
wherein the control unit determines that the second purge passage is in the blocked-up condition, when the first sensor value is within a predetermined pressure range defined by the high-pressure side reference value and the low-pressure side reference value, in a condition that the inside space of the canister is depressurized by the second pressure changing unit and the inside space of the fuel tank is depressurized by the first pressure changing unit,
wherein the first reference pressure corresponds to such a pressure inside the fuel tank, which is obtained when the inside space of the fuel tank is depressurized in a case that the fuel tank has a leakage hole corresponding to a size of the reference orifice,
wherein the high-pressure side reference value is set at a value higher than a stabilized pressure value, while the low-pressure side reference value is set at a value lower than the stabilized pressure value, and
wherein the stabilized pressure value corresponds to the pressure inside the canister, which is detected by the first pressure detecting device when the pressure inside the canister is stabilized after the second pressure changing unit is operated.

12. The vaporized fuel processing apparatus according to claim 2, wherein the first pressure detecting device is provided in the second purge pipe unit at such a position closer to the canister than a part of the second purge passage, at which the blocked-up condition is likely to occur.

13. The vaporized fuel processing apparatus according to claim 2, wherein the first pressure detecting device is provided in the first purge pipe unit, which connects the canister to the purge valve.

14. The vaporized fuel processing apparatus according to claim 2, wherein the first pressure detecting device is provided in the atmospheric passage, which connects the canister to the atmospheric valve.

15. The vaporized fuel processing apparatus according to claim 1, wherein the part of the second purge passage at which the blocked-up condition is likely to occur is vertically lower than the fuel tank in a direction of gravitational force.

16. The vaporized fuel processing apparatus according to claim 1, wherein the part of the second purge passage at which the blocked-up condition is likely to occur includes a turn portion which communicates the vaporized fuel is in a direction of gravitational force and then communicates the vaporized fuel is in a direction opposite to the direction of gravitational force.

* * * * *